United States Patent
Matono et al.

(10) Patent No.: US 7,948,716 B2
(45) Date of Patent: May 24, 2011

(54) MAGNETIC HEAD FOR PERPENDICULAR MAGNETIC RECORDING WITH A SHIELD AND A POLE LAYER HAVING A TOP SURFACE WITH FIRST AND SECOND PORTIONS AT DIFFERENT HEIGHTS, AND METHOD OF MANUFACTURING SAME

(75) Inventors: Naoto Matono, Hong Kong (CN); Koichi Otani, Tokyo (JP); Tatsuya Harada, Tokyo (JP); Noriaki Kasahara, Tokyo (JP); Takamitsu Sakamoto, Tokyo (JP); Hiroaki Kawashima, Tokyo (JP); Hirotaka Gomi, Tokyo (JP); Kenkichi Anagawa, Tokyo (JP); Norikazu Ota, Tokyo (JP)

(73) Assignees: SAE Magnetics (H.K.) Ltd., Hong Kong (CN); TDK Corporation, Tokyo (JP)

( * ) Notice: Subject to any disclaimer, the term of this patent is extended or adjusted under 35 U.S.C. 154(b) by 1023 days.

(21) Appl. No.: 11/806,828

(22) Filed: Jun. 4, 2007

(65) Prior Publication Data
US 2008/0297953 A1    Dec. 4, 2008

(51) Int. Cl.
*G11B 5/33*    (2006.01)
(52) U.S. Cl. ........................................... 360/319
(58) Field of Classification Search ............ 360/119.03, 360/119.04, 125.12, 125.15
See application file for complete search history.

(56) References Cited

U.S. PATENT DOCUMENTS

| | | | |
|---|---|---|---|
| 7,212,379 B2 * | 5/2007 | Hsu et al. | 360/125.16 |
| 2005/0219747 A1 | 10/2005 | Hsu et al. | |
| 2007/0067982 A1 * | 3/2007 | Kobayashi | 29/603.15 |

FOREIGN PATENT DOCUMENTS

| JP | A-2005-108293 | 4/2005 |
|---|---|---|
| JP | A-2005-293822 | 10/2005 |

* cited by examiner

*Primary Examiner* — David D Davis
(74) *Attorney, Agent, or Firm* — Oliff & Berridge, PLC

(57) ABSTRACT

A magnetic head includes: a coil; a pole layer; a shield having an end face located in a medium facing surface forward of an end face of the pole layer along a direction of travel of a recording medium; a gap layer between the shield and the pole layer; and a substrate on which the foregoing elements are stacked. The top surface of the pole layer includes: first and second portions with a difference in height therebetween; and a third portion connecting the first and second portions to each other. The first portion has an edge located in the medium facing surface, and the second portion is located farther from the medium facing surface and from the substrate than the first portion. The magnetic head further includes a nonmagnetic layer disposed between the second portion and the gap layer. The nonmagnetic layer has a surface touching the second portion, the surface having an edge located at the boundary between the second and third portions. The nonmagnetic layer has a thickness equal to or greater than the difference in height between the first and second portions.

12 Claims, 22 Drawing Sheets

MAGNETIC HEAD FOR PERPENDICULAR MAGNETIC RECORDING WITH A SHIELD AND A POLE LAYER HAVING A TOP SURFACE WITH FIRST AND SECOND PORTIONS AT DIFFERENT HEIGHTS, AND METHOD OF MANUFACTURING SAME

BACKGROUND OF THE INVENTION

1. Field of the Invention

The present invention relates to a magnetic head for perpendicular magnetic recording that is used for writing data on a recording medium by means of a perpendicular magnetic recording system and a method of manufacturing such a magnetic head, and to a head assembly and a hard disk drive each of which includes the magnetic head for perpendicular magnetic recording.

2. Description of the Related Art

For magnetic read/write devices such as magnetic disk drives, higher recording density has been constantly required to achieve a higher storage capacity and smaller dimensions. Typically, magnetic heads used in magnetic read/write devices are those having a structure in which a reproducing (read) head having a magnetoresistive element (that may be hereinafter referred to as an MR element) for reading and a recording (write) head having an induction-type electromagnetic transducer for writing are stacked on a substrate.

Write heads include those of a longitudinal magnetic recording system wherein signals are magnetized in the direction along the surface of the recording medium (the longitudinal direction) and those of a perpendicular magnetic recording system wherein signals are magnetized in the direction perpendicular to the surface of the recording medium. Recently, the shift from the longitudinal magnetic recording system to the perpendicular magnetic recording system has been promoted in order to achieve higher recording density of magnetic read/write devices.

A write head for the perpendicular magnetic recording system incorporates a coil for generating a magnetic field corresponding to data to be written on a recording medium, and a pole layer for allowing a magnetic flux corresponding to the magnetic field generated by the coil to pass therethrough and generating a write magnetic field for writing the data on the recording medium. The pole layer has an end face located in a medium facing surface, and the width of the end face defines the track width.

As one of magnetic heads for perpendicular magnetic recording, a magnetic head incorporating a shield is known, the shield having an end face that is located in the medium facing surface at a position forward of the end face of the pole layer along the direction of travel of the recording medium with a predetermined distance provided therebetween, as disclosed in U.S. Patent Application Publication No. US 2005/0219747 A1, for example. A gap layer made of a nonmagnetic material is provided between the pole layer and the shield. The shield has a function of preventing a magnetic flux from reaching the recording medium, the flux having been generated from the end face of the pole layer and expanding in directions except the direction orthogonal to the surface of the recording medium. A magnetic head incorporating such a shield can achieve a further improvement in recording density.

The pole layer includes, for example, a track width defining portion having a first end located in the medium facing surface and a second end located away from the medium facing surface, and a wide portion coupled to the second end of the track with defining portion and having a width greater than that of the track width defining portion. The track width defining portion has a nearly uniform width. The width of the first end of the track width defining portion, that is, the width of the end face of the pole layer located in the medium facing surface, defines the track width. Here, the length of the track width defining portion taken in the direction orthogonal to the medium facing surface is referred to as neck height. The neck height has an influence on write characteristics such as overwrite property that is a parameter indicating overwriting capability. In general, as the neck height gets smaller, magnetic flux of greater magnitude is allowed to be introduced to the medium facing surface through the pole layer, and as a result, the overwrite property improves.

However, as the neck height gets smaller, it becomes difficult to define the track width with precision. The reason is as follows. It is difficult to precisely form a portion of a side surface of the pole layer near the boundary between the track width defining portion and the wide portion. It is therefore likely that the portion of the pole layer near the boundary between the track width defining portion and the wide portion has such a shape that the width gradually increases with increasing distance from the medium facing surface. As a result, as the neck height gets smaller, it becomes difficult to precisely define the width of the first end of the track width defining portion, that is, the track width.

A magnetic head used for a magnetic disk drive such as a hard disk drive is typically provided in a slider. The slider has the medium facing surface mentioned above. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs according to the position of the magnetic head across the tracks.

In a magnetic disk drive of the perpendicular magnetic recording system that exhibits a better capability of writing on a recording medium than the longitudinal magnetic recording system, in particular, if the above-mentioned skew occurs, there arise problems such as a phenomenon in which, when data is written on a specific track, data stored on a track adjacent thereto is erased (that is hereinafter referred to as adjacent track erasing), or unwanted writing between two adjacent tracks. To achieve higher recording density, it is required to suppress adjacent track erasing. Unwanted writing between two adjacent tracks affects detection of servo signals for alignment of the magnetic head and the signal-to-noise ratio of a read signal.

To prevent the occurrence of the above-mentioned problems resulting from the skew, it is effective to reduce the thickness of the track width defining portion taken in the medium facing surface. However, if the thickness of the entire pole layer is reduced, the cross-sectional area of the pole layer orthogonal to the direction in which magnetic flux flows is reduced. As a result, it becomes impossible for the pole layer to introduce magnetic flux of great magnitude to the medium facing surface, which results in degradation in overwrite property.

To cope with this, a possible measure is to form a stepped portion in a surface of the pole layer closer to the shield to thereby make the thickness of a portion of the pole layer near the medium facing surface smaller than the thickness of the other portion of the pole layer, as disclosed in U.S. Patent Application Publication 2005/0219747 A1. This makes it possible to reduce the thickness of the track width defining portion taken in the medium facing surface and to introduce magnetic flux of great magnitude to the medium facing surface through the pole layer. Furthermore, if it is thus possible to introduce magnetic flux of great magnitude to the medium facing surface, it becomes unnecessary to greatly reduce the neck height, and as a result, it becomes possible to define the track width with precision.

However, if a stepped portion is formed in the surface of the pole layer closer to the shield so as to make the thickness of the portion of the pole layer near the medium facing surface smaller than the thickness of the other portion of the pole layer, there arises a problem that flux leakage from the pole layer to the shield is likely to occur to thereby cause degradation of the write magnetic field. Furthermore, it is assumed that the amount of magnetic flux leaking from the pole layer to the shield is subject to change depending on the shape of the surface of the pole layer closer to the shield and the shape of a portion of the shield opposed to the pole layer with the gap layer disposed in between. Therefore, if those shapes vary due to the manufacturing process of magnetic heads, there also arises a problem of variations in write magnetic field.

OBJECT AND SUMMARY OF THE INVENTION

It is an object of the present invention to provide a magnetic head for perpendicular magnetic recording and a method of manufacturing the same, the magnetic head being capable of introducing magnetic flux of great magnitude to a medium facing surface through a pole layer and being capable of providing a large write magnetic field, and to provide a head assembly and a magnetic disk drive each incorporating the magnetic head for perpendicular magnetic recording.

A magnetic head for perpendicular magnetic recording of the present invention includes: a medium facing surface that faces toward a recording medium; a coil that generates a magnetic field corresponding to data to be written on the recording medium; a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system; a shield made of a magnetic material and having an end face located in the medium facing surface at a position forward of the end face of the pole layer along a direction of travel of the recording medium; a gap layer made of a nonmagnetic material, disposed between the shield and the pole layer and having an end face located in the medium facing surface; and a substrate on which the coil, the pole layer, the gap layer and the shield are stacked.

In the magnetic head for perpendicular magnetic recording of the present invention, the pole layer is located closer to the substrate than the shield. The pole layer has a top surface that is farther from the substrate. The top surface of the pole layer includes: a first portion and a second portion with a difference in height therebetween; and a third portion that connects the first portion and the second portion to each other. The first portion has an edge located in the medium facing surface, and the second portion is located farther from the medium facing surface and farther from the substrate than the first portion. The magnetic head further includes a nonmagnetic layer made of a nonmagnetic material and disposed between the second portion and the gap layer. The nonmagnetic layer has a surface that touches the second portion, the surface having an edge located at the boundary between the second portion and the third portion. The nonmagnetic layer has a thickness that is equal to or greater than the difference in height between the first portion and the second portion.

A head assembly of the present invention includes: a slider including the magnetic head of the present invention and disposed to face toward a recording medium; and a supporter flexibly supporting the slider.

A magnetic disk drive of the present invention includes: a slider including the magnetic head of the present invention and disposed to face toward a recording medium that is driven to rotate; and an alignment device supporting the slider and aligning the slider with respect to the recording medium.

A method of manufacturing the magnetic head for perpendicular magnetic recording includes the steps of: forming a magnetic layer that is to undergo partial etching later to thereby become the pole layer; forming the nonmagnetic layer on the magnetic layer; partially etching the magnetic layer using the nonmagnetic layer as a mask so that the first to third portions are formed in a top surface of the magnetic layer and the magnetic layer thereby becomes the pole layer; forming the gap layer on the pole layer and the nonmagnetic layer; forming the shield on the gap layer; and forming the coil.

In the magnetic head for perpendicular magnetic recording or the method of manufacturing the same of the present invention, the nonmagnetic layer may be made of an inorganic insulating material or a metallic material.

In the magnetic head for perpendicular magnetic recording or the method of manufacturing the same of the present invention, the shield may be connected to the pole layer at a position away from the medium facing surface, and the coil may include a portion that passes through a space surrounded by the pole layer and the shield.

In the magnetic head for perpendicular magnetic recording or the method of manufacturing the same of the present invention, the shield may include a first layer disposed adjacent to the gap layer and a second layer disposed on a side of the first layer opposite to the gap layer, and the first layer may have a surface that bends to be opposed to the first portion, the second portion and the third portion with the gap layer disposed in between.

According to the magnetic head or the method of manufacturing the same of the present invention, or the head assembly or the magnetic disk drive including the magnetic head of the present invention, it is possible to reduce leakage of magnetic flux from the pole layer to the shield, and to thereby introduce magnetic flux of great magnitude to the medium facing surface through the pole layer, and to obtain a greater write magnetic field.

Other and further objects, features and advantages of the invention will appear more fully from the following description.

DETAILED DESCRIPTION OF THE PREFERRED EMBODIMENT

Figure 2:
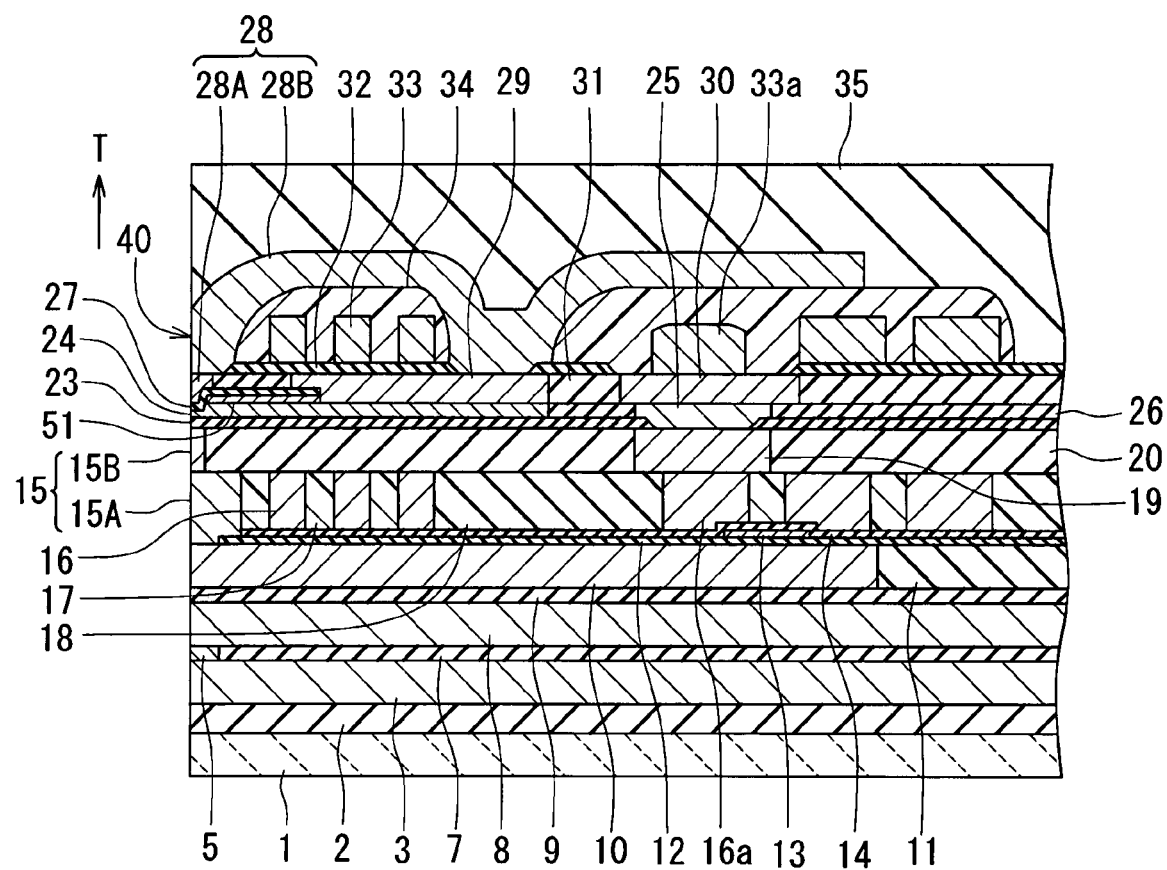
FIG. 2 is a cross-sectional view illustrating the configuration of the magnetic head of the embodiment of the invention.
Figure 3:
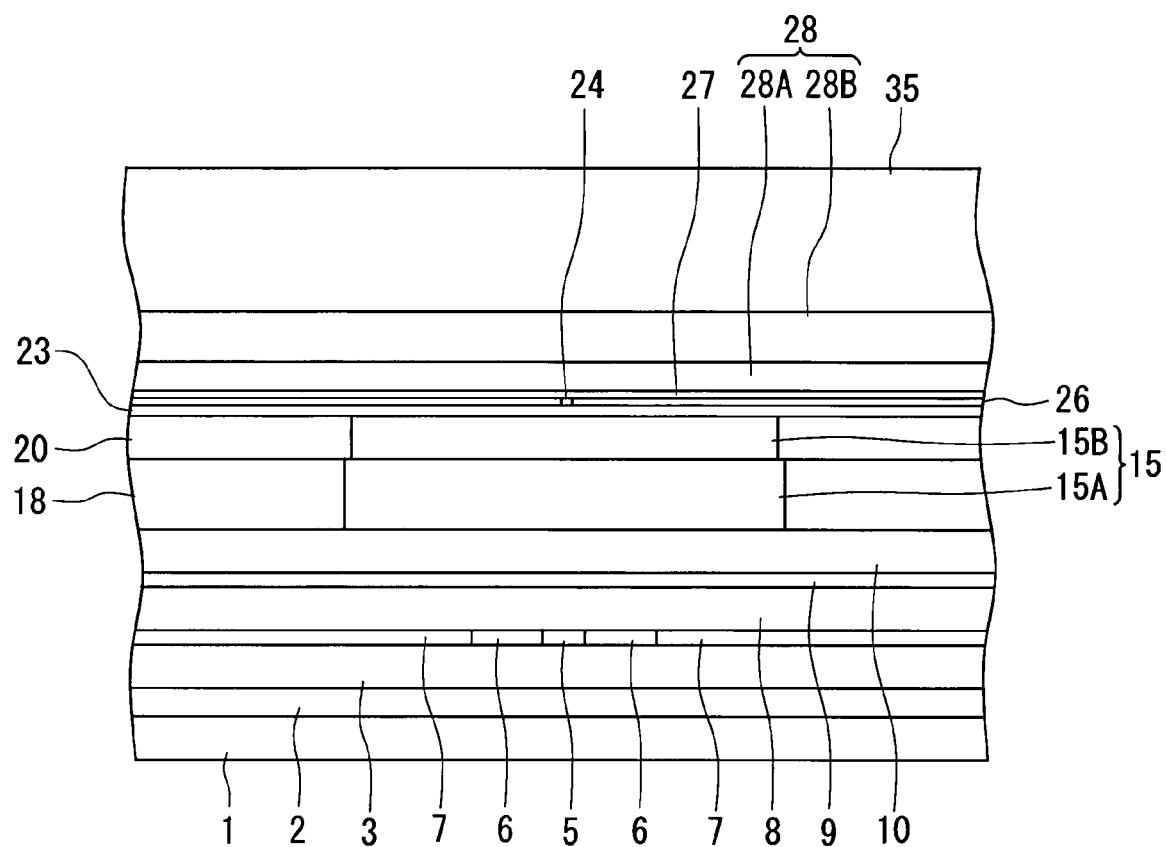
FIG. 3 is a front view of the medium facing surface of the magnetic head of the embodiment of the invention.

An embodiment of the present invention will now be described in detail with reference to the drawings. Reference is now made to FIG. 2 and FIG. 3 to describe the configuration of a magnetic head for perpendicular magnetic recording (hereinafter simply referred to as a magnetic head) of the embodiment of the invention. Here is given an example of a magnetic head in which a TMR element utilizing a tunneling magnetoresistive effect is employed as the MR element. FIG. 2 is a cross-sectional view illustrating the configuration of the magnetic head. FIG. 3 is a front view illustrating the medium facing surface of the magnetic head. FIG. 2 illustrates a cross section orthogonal to the medium facing surface and the top surface of the substrate. The arrow indicated with T in FIG. 2 shows the direction of travel of a recording medium.

As illustrated in FIG. 2, the magnetic head of the embodiment has a medium facing surface 40 that faces toward a recording medium. As illustrated in FIG. 2 and FIG. 3, the magnetic head includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a first read shield layer 3 made of a magnetic material and disposed on the insulating layer 2; an MR element 5 disposed on the first read shield layer 3; two bias magnetic field applying layers 6 disposed adjacent to two sides of the MR element 5, respectively, with insulating films (not shown) respectively disposed therebetween; and an insulating layer 7 disposed around the MR element 5 and the bias magnetic field applying layers 6. The MR element 5 has an end located in the medium facing surface 40. The insulating layer 7 is made of an insulating material such as alumina. The magnetic head further includes: a second read shield layer 8 made of a magnetic material and disposed on the MR element 5, the bias magnetic field applying layers 6 and the insulating layer 7; and a separating layer 9 made of a nonmagnetic material such as alumina and disposed on the second read shield layer 8. The portion from the first read shield layer 3 to the second read shield layer 8 makes up a read head.

The MR element 5 is a TMR element. A sense current for detecting magnetic signals is fed to the MR element 5 in a direction intersecting the plane of each layer making up the MR element 5, such as the direction perpendicular to the plane of each layer making up the MR element 5.

The magnetic head further includes: a magnetic layer 10 made of a magnetic material and disposed on the separating layer 9; and an insulating layer 11 made of an insulating material such as alumina and disposed around the magnetic layer 10. The magnetic layer 10 has an end face located in the medium facing surface 40. The magnetic layer 10 and the insulating layer 11 have flattened top surfaces.

The magnetic head further includes: an insulating film 12 disposed on the magnetic layer 10 and the insulating layer 11; a heater 13 disposed on the insulating film 12; and an insulating film 14 disposed on the insulating film 12 and the heater 13 such that the heater 13 is sandwiched between the insulating films 12 and 14. The function and material of the heater 13 will be described later. The insulating films 12 and 14 are made of an insulating material such as alumina. An end of each of the insulating films 12 and 14 closer to the medium facing surface 40 is located at a distance from the medium facing surface 40. In the example illustrated in FIG. 2, the end of the insulating film 14 closer to the medium facing surface 40 is located farther from the medium facing surface 40 than the end of the insulating film 12 closer to the medium facing surface 40. On the contrary, however, the end of the insulating film 12 closer to the medium facing surface 40 may be located farther from the medium facing surface 40 than the end of the insulating film 14 closer to the medium facing surface 40. Alternatively, the end of the insulating film 12 closer to the medium facing surface 40 and the end of the insulating film 14 closer to the medium facing surface 40 may be located such that the respective distances from the medium facing surface 40 are equal.

The magnetic head further includes a first shield 15 disposed on the magnetic layer 10. The first shield 15 includes: a first layer 15A disposed on the magnetic layer 10; and a second layer 15B disposed on the first layer 15A. The first layer 15A and the second layer 15B are made of a magnetic material. Each of the first layer 15A and the second layer 15B has an end face located in the medium facing surface 40. In the example illustrated in FIG. 2, the length of the second layer 15B taken in the direction orthogonal to the medium facing surface 40 is smaller than the length of the first layer 15A taken in the direction orthogonal to the medium facing surface 40. However, the length of the second layer 15B taken in the direction orthogonal to the medium facing surface 40 may be equal to or greater than the length of the first layer 15A taken in the direction orthogonal to the medium facing surface 40.

The magnetic head further includes: a coil 16 made of a conductive material and disposed on the insulating film 14; an insulating layer 17 with which the space between the coil 16 and the first layer 15A and the space between respective adjacent turns of the coil 16 are filled; and an insulating layer 18 disposed around the first layer 15A, the coil 16 and the insulating layer 17. The coil 16 is planar spiral-shaped. The coil 16 includes a connecting portion 16a that is a portion near an inner end of the coil 16 and connected to another coil described later. The insulating layer 17 is made of photoresist, for example. The insulating layer 18 is made of alumina, for example. The first layer 15A, the coil 16, the insulating layer 17 and the insulating layer 18 have flattened top surfaces.

The magnetic head further includes: a connecting layer 19 made of a conductive material and disposed on the connecting portion 16a; and an insulating layer 20 made of an insulating material such as alumina and disposed around the second layer 15B and the connecting layer 19. The connecting layer 19 may be made of a material the same as that of the second layer 15B. The second layer 15B, the connecting layer 19 and the insulating layer 20 have flattened top surfaces.

The magnetic head further includes a first gap layer 23 disposed on the second layer 15B, the connecting layer 19 and the insulating layer 20. The first gap layer 23 has an opening formed in a region corresponding to the top surface of the connecting layer 19. The first gap layer 23 is made of a nonmagnetic insulating material such as alumina.

The magnetic head further includes: a pole layer 24 made of a magnetic material and disposed on the first gap layer 23; a connecting layer 25 made of a conductive material and disposed on the connecting layer 19; and an insulating layer 26 made of an insulating material such as alumina and disposed around the pole layer 24 and the connecting layer 25. The pole layer 24 has an end face located in the medium facing surface 40. The connecting layer 25 is connected to the connecting layer 19 through the opening of the first gap layer 23. The connecting layer 25 may be made of a material the same as that of the pole layer 24. The shape of the pole layer 24 will be described in detail later.

The magnetic head further includes a nonmagnetic layer 51 made of a nonmagnetic material and disposed on part of the top surface of the pole layer 24. The nonmagnetic layer 51 is made of an inorganic insulating material or a metallic material, for example. Examples of the inorganic insulating material used for the nonmagnetic layer 51 include alumina and $SiO_2$. Examples of the metallic material used for the nonmagnetic layer 51 include Ru and Ti. The shape of the nonmagnetic layer 51 will be described in detail later.

The magnetic head further includes a second gap layer 27 disposed on part of the pole layer 24 and on the nonmagnetic layer 51. A portion of the top surface of the pole layer 24 apart from the medium facing surface 40 and the top surface of the connecting layer 25 are not covered with the nonmagnetic layer 51 and the second gap layer 27. The second gap layer 27 is made of a nonmagnetic material such as alumina. The second gap layer 27 corresponds to the gap layer of the present invention.

The magnetic head further includes a second shield 28 disposed on the second gap layer 27. The second shield 28 includes: a first layer 28A disposed adjacent to the second gap layer 27; and a second layer 28B disposed on a side of the first layer 28A opposite to the second gap layer 27 and connected to the first layer 28A. The first layer 28A and the second layer 28B are made of a magnetic material. Each of the first layer 28A and the second layer 28B has an end face located in the medium facing surface 40. The second shield 28 corresponds to the shield of the present invention. The shape of the first layer 28A will be described in detail later.

The magnetic head further includes: a yoke layer 29 made of a magnetic material and disposed on a portion of the pole layer 24 away from the medium facing surface 40; a connecting layer 30 made of a conductive material and disposed on the connecting layer 25; and an insulating layer 31 made of an insulating material such as alumina and disposed around the first layer 28A, the yoke layer 29 and the connecting layer 30. The yoke layer 29 and the connecting layer 30 may be made of a material the same as that of the first layer 28A. The first layer 28A, the yoke layer 29, the connecting layer 30 and the insulating layer 31 have flattened top surfaces.

The magnetic head further includes an insulating layer 32 made of an insulating material such as alumina and disposed on the yoke layer 29 and the insulating layer 31. The insulating layer 32 has an opening for exposing the top surface of the first layer 28A, an opening for exposing a portion of the top surface of the yoke layer 29 near an end thereof farther from the medium facing surface 40, and an opening for exposing the top surface of the connecting layer 30.

The magnetic head further includes a coil 33 made of a conductive material and disposed on the insulating layer 32. The coil 33 is planar spiral-shaped. The coil 33 includes a connecting portion 33a that is a portion near an inner end of the coil 33 and connected to the connecting portion 16a of the coil 16. The connecting portion 33a is connected to the connecting layer 30, and connected to the connecting portion 16a through the connecting layers 19, 25 and 30.

The magnetic head further includes an insulating layer 34 disposed to cover the coil 33. The insulating layer 34 is made of photoresist, for example. The second layer 28B of the second shield 28 is disposed on the first layer 28A, the yoke layer 29 and the insulating layer 34, and connects the first layer 28A and the yoke layer 29 to each other.

The magnetic head further includes an overcoat layer 35 made of an insulating material such as alumina and disposed to cover the second layer 28B. The portion from the magnetic layer 10 to the second layer 28B makes up a write head.

As described so far, the magnetic head includes the medium facing surface 40 that faces toward the recording medium, the read head, and the write head. The read head and the write head are stacked on the substrate 1. The read head is disposed backward along the direction T of travel of the recording medium (that is, disposed closer to the air-inflow end of the slider), while the write head is disposed forward along the direction T of travel of the recording medium (that is, disposed closer to the air-outflow end of the slider). The magnetic head writes data on the recording medium through the use of the write head, and reads data stored on the recording medium through the use of the read head.

The read head includes the MR element 5, and the first read shield layer 3 and the second read shield layer 8 that are disposed to sandwich the MR element 5 therebetween. FIG. 2 and FIG. 3 illustrate an example in which the MR element 5 is a TMR element. The first read shield layer 3 and the second read shield layer 8 also function as a pair of electrodes for feeding a sense current to the MR element 5 in a direction intersecting the plane of each layer making up the MR element 5, such as the direction perpendicular to the plane of each layer making up the MR element 5. Besides the first read shield layer 3 and the second read shield layer 8, there may be provided a pair of electrodes on top and bottom of the MR element 5, respectively. The MR element 5 has a resistance that changes in response to an external magnetic field, that is, a signal magnetic field sent from the recording medium. The resistance of the MR element 5 can be determined from the sense current. It is thus possible for the read head to read data stored on the recording medium.

The MR element 5 is not limited to the TMR element but may be a GMR (giant-magnetoresistive) element. The GMR element may be one having a CIP (current-in-plane) structure in which the sense current is fed in a direction nearly parallel to the plane of each layer making up the GMR element, or may be one having a CPP (current-perpendicular-to-plane) structure in which the sense current is fed in a direction intersecting the plane of each layer making up the GMR element, such as the direction perpendicular to the plane of each layer making up the GMR element. In the case in which the MR element 5 is a GMR element having the CIP structure, a pair of electrodes for feeding the sense current to the MR element 5 are respectively provided on both sides of the MR element 5 that are opposed to each other in the width direction, and shield gap films made of an insulating material are respectively provided between the MR element 5 and the first read shield layer 3 and between the MR element 5 and the second read shield layer 8.

The write head includes the magnetic layer 10, the first shield 15, the coil 16, the first gap layer 23, the pole layer 24, the nonmagnetic layer 51, the second gap layer 27, the second shield 28, the yoke layer 29, and the coil 33. The first shield 15 is located closer to the substrate 1 than the second shield 28. The pole layer 24 is located closer to the substrate 1 than the second shield 28.

The coils 16 and 33 generate a magnetic field that corresponds to data to be written on the recording medium. The pole layer 24 has an end face located in the medium facing surface 40, allows a magnetic flux corresponding to the magnetic field generated by the coils 16 and 33 to pass, and generates a write magnetic field used for writing the data on the recording medium by means of the perpendicular magnetic recording system.

The first shield 15 is made of a magnetic material, and has an end face located in the medium facing surface 40 at a position backward of the end face of the pole layer 24 along the direction T of travel of the recording medium. The first gap layer 23 is made of a nonmagnetic material, has an end face located in the medium facing surface 40, and is disposed between the first shield 15 and the pole layer 24. In the embodiment, the first shield 15 includes the first layer 15A disposed on the magnetic layer 10, and the second layer 15B disposed on the first layer 15A. Part of the coil 16 is located on a side of the first layer 15A so as to pass through the space between the magnetic layer 10 and the pole layer 24.

The first layer 15A has a thickness within a range of 0.5 to 3 μm, for example. The first layer 15A has a width of 5 μm or greater, for example. The length of the first layer 15A taken in the direction orthogonal to the medium facing surface 40 is within a range of 0.5 to 2.0 μm, for example. The second layer 15B has a thickness within a range of 0.1 to 1.5 μm, for example. The second layer 15B has a width of 5 μm or greater, for example. The length of the second layer 15B taken in the direction orthogonal to the medium facing surface 40 is within a range of 0.1 to 1.0 μm, for example. However, the length of the second layer 15B taken in the direction orthogonal to the medium facing surface 40 is preferably smaller than the length of the first layer 15A taken in the direction orthogonal to the medium facing surface 40. The "thickness" of each of the layers that make up the magnetic head, such as the first layer 15A and the second layer 15B, is the dimension taken in the direction in which the plurality of layers making up the magnetic head are stacked.

The magnetic layer 10 has a function of returning a magnetic flux that has been generated from the end face of the pole layer 24 and has magnetized the recording medium. FIG. 2 illustrates an example in which the magnetic layer 10 has an end face located in the medium facing surface 40. However, since the magnetic layer 10 is connected to the first shield 15 that has the end face located in the medium facing surface 40, an end face of the magnetic layer 10 closer to the medium facing surface 40 may be located at a distance from the medium facing surface 40.

In the medium facing surface 40, the end face of the first shield 15 (the end face of the second layer 15B) is located backward of the end face of the pole layer 24 along the direction T of travel of the recording medium (that is, located closer to the air-inflow end of the slider) with a specific small distance provided therebetween by the first gap layer 23. The distance between the end face of the pole layer 24 and the end face of the first shield 15 in the medium facing surface 40 is preferably within a range of 0.05 to 0.7 μm, and more preferably within a range of 0.1 to 0.3 μm.

The first shield 15 takes in a magnetic flux that is generated from the end face of the pole layer 24 located in the medium facing surface 40 and that expands in directions except the direction orthogonal to the surface of the recording medium, and thereby prevents this flux from reaching the recording medium. It is thereby possible to improve recording density.

The second shield 28 is made of a magnetic material, and has an end face located in the medium facing surface 40 at a position forward of the end face of the pole layer 24 along the direction T of travel of the recording medium. The second gap layer 27 is made of a nonmagnetic material, has an end face located in the medium facing surface 40, and is disposed between the second shield 28 and the pole layer 24. In the embodiment, the second shield 28 includes: the first layer 28A disposed adjacent to the second gap layer 27; and the second layer 28B disposed on a side of the first layer 28A opposite to the second gap layer 27 and connected to the first layer 28A. Part of the coil 33 is disposed to pass through the space surrounded by the pole layer 24 and the second shield 28. The second shield 28 is connected to the yoke layer 29 at a position away from the medium facing surface 40. Therefore, the second shield 28 is connected to the pole layer 24 through the yoke layer 29 at a position away from the medium facing surface 40. The pole layer 24, the second shield 28 and the yoke layer 29 form a magnetic path that allows a magnetic flux corresponding to the magnetic field generated by the coil 33 to pass therethrough.

In the medium facing surface 40, the end face of the second shield 28 (the end face of the first layer 28A) is located forward of the end face of the pole layer 24 along the direction T of travel of the recording medium (that is, located closer to the air-outflow end of the slider) with a specific small distance provided therebetween by the second gap layer 27. The distance between the end face of the pole layer 24 and the end face of the second shield 28 in the medium facing surface 40 is preferably equal to or smaller than 200 nm, and more preferably within a range of 25 to 50 nm, so that the second shield 28 can fully exhibit its function as a shield.

The position of the end of a bit pattern to be written on the recording medium is determined by the position of an end of the pole layer 24 closer to the second gap layer 27 in the medium facing surface 40. The second shield 28 takes in a magnetic flux that is generated from the end face of the pole layer 24 located in the medium facing surface 40 and that expands in directions except the direction orthogonal to the surface of the recording medium, and thereby prevents this flux from reaching the recording medium. It is thereby possible to improve recording density. Furthermore, the second shield 28 takes in a disturbance magnetic field applied from outside the magnetic head to the magnetic head. It is thereby possible to prevent erroneous writing on the recording medium caused by the disturbance magnetic field intensively taken in into the pole layer 24. The second shield 28 also has a function of returning a magnetic flux that has been generated from the end face of the pole layer 24 and has magnetized the recording medium.

FIG. 2 illustrates an example in which neither the magnetic layer 10 nor the first shield 15 is connected to the pole layer 24. However, the magnetic layer 10 may be connected to the pole layer 24 at a position away from the medium facing surface 40. The coil 16 is not an essential component of the write head and can be dispensed with. In the example illustrated in FIG. 2, the yoke layer 29 is disposed on the pole layer 24, that is, disposed forward of the pole layer 24 along the direction T of travel of the recording medium (that is, disposed closer to the air-outflow end of the slider). However, the yoke layer 29 may be disposed below the pole layer 24, that is, disposed backward of the pole layer 24 along the direction T of travel of the recording medium (that is, disposed closer to the air-inflow end of the slider).

The heater 13 is provided for heating the components of the write head including the pole layer 24 so as to control the distance between the recording medium and the end face of the pole layer 24 located in the medium facing surface 40. Two leads that are not shown are connected to the heater 13. For example, the heater 13 is composed of a NiCr film or a layered film made up of a Ta film, a NiCu film and a Ta film. The heater 13 is energized through the two leads and thereby produces heat, and heats the components of the write head. As a result, the components of the write head expand and the end face of the pole layer 24 located in the medium facing surface 40 thereby gets closer to the recording medium.

Figure 1:
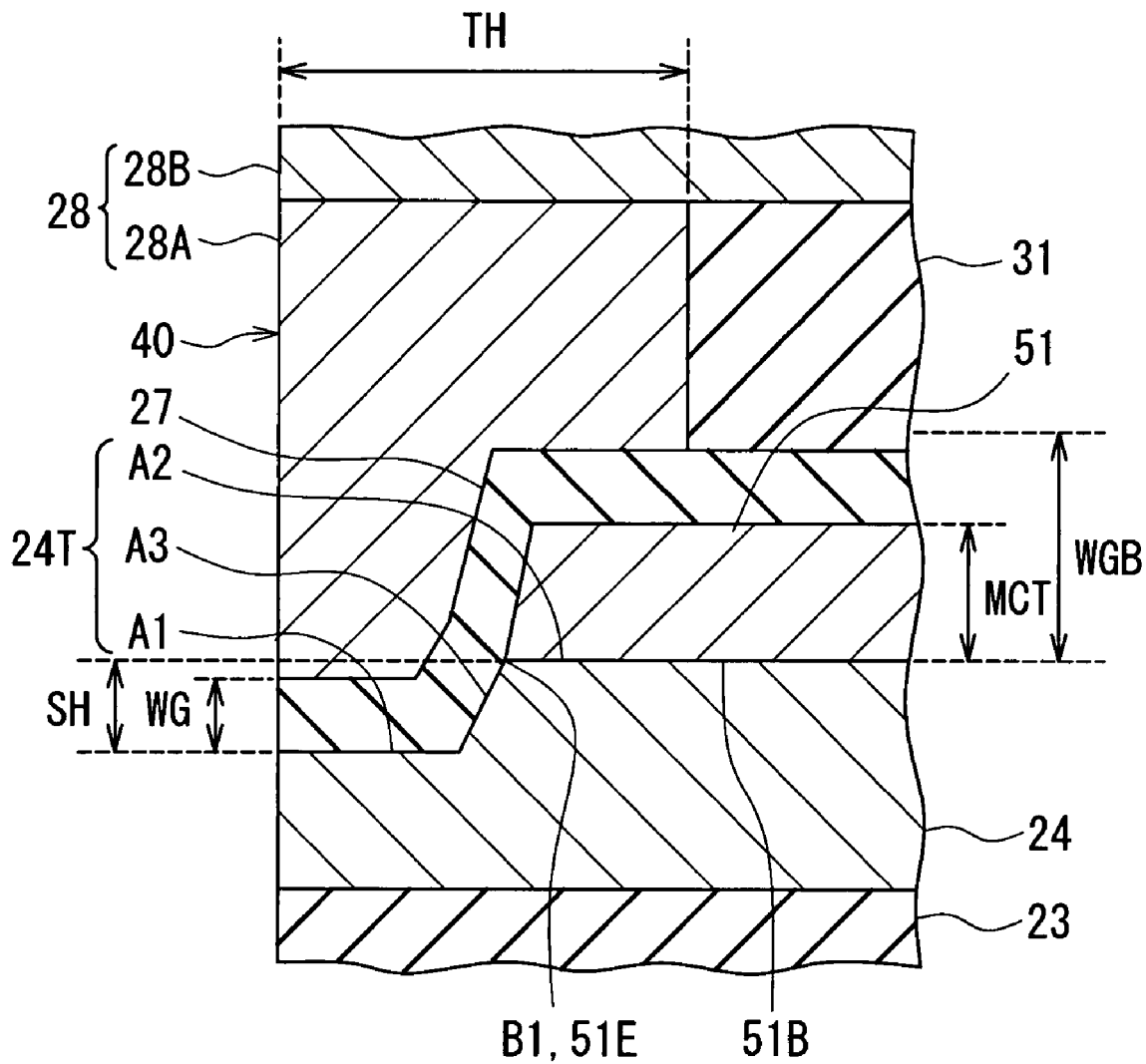
FIG. 1 is a cross-sectional view illustrating the configuration of a main part of a magnetic head of an embodiment of the invention.

Reference is now made to FIG. 1 to describe the pole layer 24, the nonmagnetic layer 51, the second gap layer 27 and the second shield 28 of the embodiment in detail. FIG. 1 is a cross-sectional view of a main part of the magnetic head. As illustrated in FIG. 1, the pole layer 24 has a top surface 24T that is farther from the substrate 1 (see FIG. 2). The top surface 24T includes: a first portion A1 and a second portion A2 with a difference in height therebetween; and a third portion A3 that connects the first portion A1 and the second portion A2 to each other. The first portion A1 has an edge located in the medium facing surface 40. The second portion A2 is located farther from the medium facing surface 40 and farther from the substrate 1 than the first portion A1.

The nonmagnetic layer 51 is disposed between the second portion A2 and the second gap layer 27. An end of the nonmagnetic layer 51 closer to the medium facing surface 40 is located away from the medium facing surface 40. The nonmagnetic layer 51 has a surface 51B that touches the second portion A2, and this surface 51B has an edge 51E located at the boundary B1 between the second portion A2 and the third portion A3.

The second gap layer 27 is disposed adjacent to the first portion A1 and the third portion A3 of the top surface 24T of the pole layer 24, and to the end of the nonmagnetic layer 51 closer to the medium facing surface 40 and the top surface of the nonmagnetic layer 51.

The first layer 28A of the second shield 28 has a surface (bottom surface) that bends to be opposed to the first portion A1, the second portion A2 and the third portion A3 with the second gap layer 27 disposed in between.

Here, as shown in FIG. 1, the difference in height between the first portion A1 and the second portion A2 is indicated with "SH" and the thickness of the nonmagnetic layer 51 is indicated with "MCT". To be specific, the difference in height SH is the difference in height between the edge of the first portion A1 located in the medium facing surface 40 and the boundary B1 between the second portion A2 and the third portion A3, that is, the difference between them in distance from the top surface of the substrate 1. The thickness MCT of the nonmagnetic layer 51 is equal to or greater than the difference in height SH between the first portion A1 and the second portion A2. The thickness of the second gap layer 27 is indicated with "WG". The distance between the end face of the pole layer 24 and the end face of the second shield layer 28 in the medium facing surface 40 is equal to the thickness WG of the second gap layer 27. The distance between the second portion A2 and the bottom surface of the first layer 28A taken in the direction of thickness of the nonmagnetic layer 51 is indicated with "WGB". The distance WGB is the sum of the thickness MCT of the nonmagnetic layer 51 and the thickness WG of the second gap layer 27. Therefore, the distance WGB is greater than the distance (WG) between the end face of the pole layer 24 and the end face of the second shield layer 28 in the medium facing surface 40 by the thickness MCT of the nonmagnetic layer 51.

The thickness WG of the second gap layer 27, that is, the distance between the end face of the pole layer 24 and the end face of the second shield 28 in the medium facing surface 40, is preferably equal to or smaller than 200 nm, and more preferably within a range of 25 to 50 nm, as previously mentioned. The difference in height SH between the first portion A1 and the second portion A2 is within a range of 30 to 150 nm, for example. The thickness MCT of the nonmagnetic layer 51 is within a range of 50 to 250 nm, for example. The distance WGB between the second portion A2 and the bottom surface of the first layer 28A is within a range of 70 to 300 nm, for example.

In the embodiment, the length of the first layer 28A taken in the direction orthogonal to the medium facing surface 40 is called throat height, and is indicated with "TH". The distance between the pole layer 24 and the second shield 28 taken in a region farther from the medium facing surface 40 than an end of the first layer 28A farther from the medium facing surface 40 is noticeably greater than the distance between the pole layer 24 and the second shield 28 taken in a region closer to the medium facing surface 40 than the end of the first layer 28A farther from the medium facing surface 40. The throat height TH is within a range of 0.05 to 0.30 μm, for example.

Figure 4:
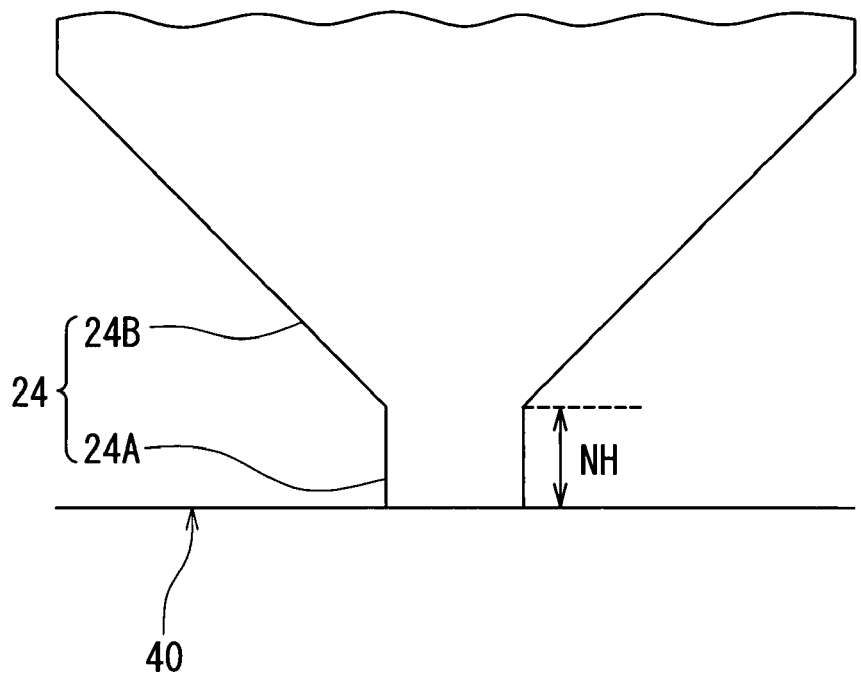
FIG. 4 is a top view of part of a pole layer of the embodiment of the invention.

Reference is now made to FIG. 4 to describe the plane geometry of the pole layer 24. FIG. 4 is a top view of a portion of the pole layer 24 near the medium facing surface 40. The pole layer 24 includes a track width defining portion 24A and a wide portion 24B. The track width defining portion 24A includes a first end located in the medium facing surface 40 and a second end located away from the medium facing surface 40, and has a width that defines track width. The wide portion 24B is coupled to the second end of the track width defining portion 24A and has a width greater than the width of the track width defining portion 24A. The width of the track width defining portion 24A is nearly uniform. The wide portion 24B is, for example, equal in width to the track width defining portion 24A at the boundary with the track width defining portion 24A, and gradually increases in width with increasing distance from the medium facing surface 40 and then maintains a specific width to the end of the wide portion 24B. Here, the length of the track width defining portion 24A taken in the direction orthogonal to the medium facing surface 40 is called neck height, and is indicated with "NH". The neck height NH is within a range of 0.05 to 0.20 μm, for example. The throat height TH and the neck height NH may be equal or different.

Reference is now made to FIG. 5 to FIG. 21 to describe a method of manufacturing the magnetic head of the embodiment. Each of FIG. 5 to FIG. 21 is a cross-sectional view of a stack of layers obtained in the course of manufacture of the magnetic head. In FIG. 5 to FIG. 21 the portions from the substrate 1 to the separating layer 9 are omitted. In FIG. 5 to FIG. 21 the broken line marked with ABS indicates the position at which the medium facing surface 40 is to be formed.

In the method of manufacturing the magnetic head of the embodiment, for example, components of a plurality of magnetic heads are formed on a single substrate (wafer) to thereby fabricate a substructure in which pre-slider portions each of which is to become a slider later are aligned in a plurality of rows. Next, the substructure is cut to fabricate a slider aggregate including a single row of the pre-slider portions. Next, a surface formed in the slider aggregate by cutting the substructure is lapped to form the medium facing surfaces 40 of the pre-slider portions that the slider aggregate includes. Next, flying rails are formed in the medium facing surfaces 40. Next, the slider aggregate is cut so that the pre-slider portions are separated from one another, and a plurality of sliders respectively including the magnetic heads are thereby obtained.

Attention being drawn to one of the magnetic heads, the method of manufacturing the magnetic head of the embodiment will now be described. In this method, first, the insulating layer 2 is formed on the substrate 1. Next, the first read shield layer 3 is formed on the insulating layer 2. Next, the MR element 5, the two bias magnetic field applying layers 6 and the insulating layer 7 are formed on the first read shield layer 3. Next, the second read shield layer 8 is formed on the MR element 5, the bias magnetic field applying layers 6 and the insulating layer 7. Next, the separating layer 9 is formed on the second read shield layer 8.

Figure 5:
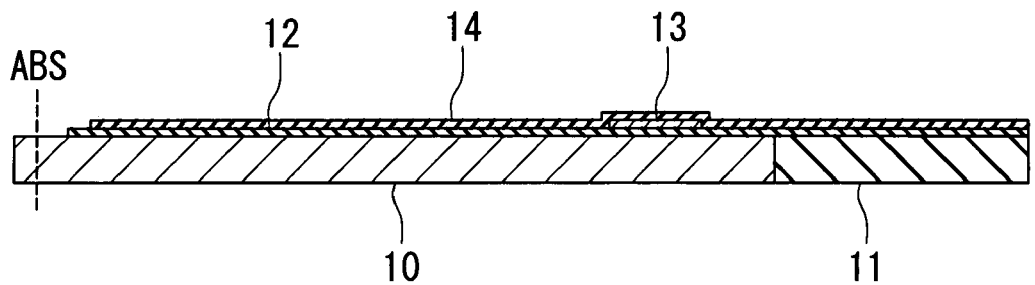
FIG. 5 is a cross-sectional view illustrating a step of a method of manufacturing the magnetic head of the embodiment of the invention.

FIG. 5 illustrates the next step. In this step, first, the magnetic layer 10 is formed on the separating layer 9 by frame plating, for example. Next, the insulating layer 11 is formed to cover the magnetic layer 10. Next, the insulating layer 11 is polished by chemical mechanical polishing (hereinafter referred to as CMP), for example, so that the magnetic layer 10 is exposed, and the top surfaces of the magnetic layer 10 and the insulating layer 11 are thereby flattened. Next, the insulating film 12 is formed on the magnetic layer 10 and the insulating layer 11. Next, the heater 13, and the leads (not shown) are formed on the insulating film 12. Next, the insulating film 14 is formed on the insulating film 12, the heater 13 and the leads so as to cover the heater 13 and the leads.

Figure 6:
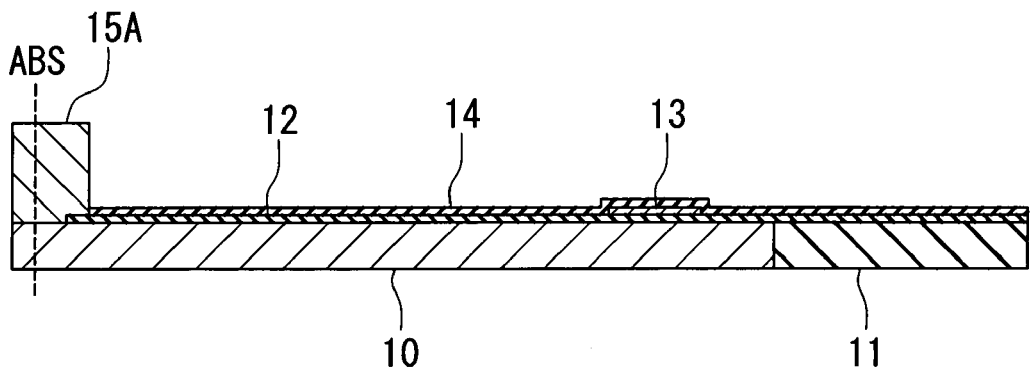
FIG. 6 is a cross-sectional view illustrating a step that follows the step of FIG. 5.
Figure 7:
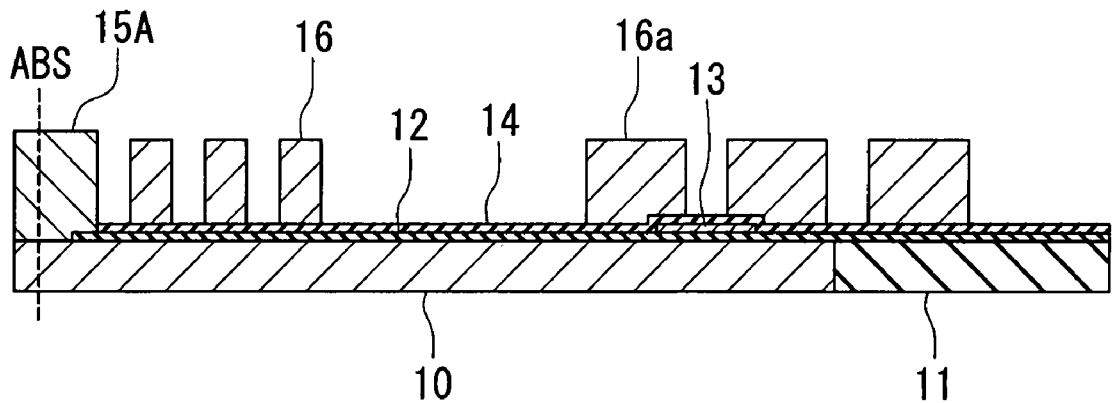
FIG. 7 is a cross-sectional view illustrating a step that follows the step of FIG. 6.
Figure 8:
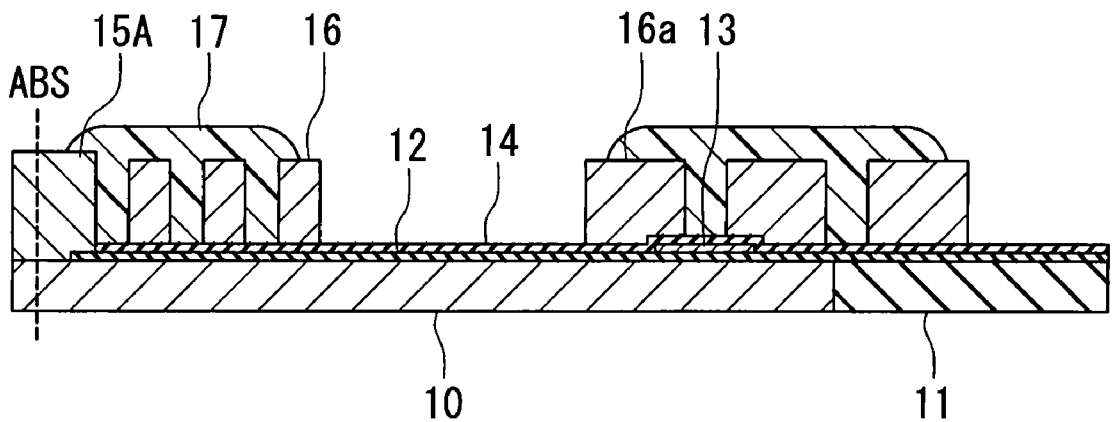
FIG. 8 is a cross-sectional view illustrating a step that follows the step of FIG. 7.

Next, as illustrated in FIG. 6, the first layer 15A of the first shield 15 is formed on the magnetic layer 10 by frame plating, for example. Next, as illustrated in FIG. 7, the coil 16 is formed on the insulating film 14 by frame plating, for example. Next, as illustrated in FIG. 8, the insulating layer 17 is formed so that the space between the coil 16 and the first layer 15A and the space between the respective adjacent turns of the coil 16 are filled with the insulating layer 17.

Figure 9:
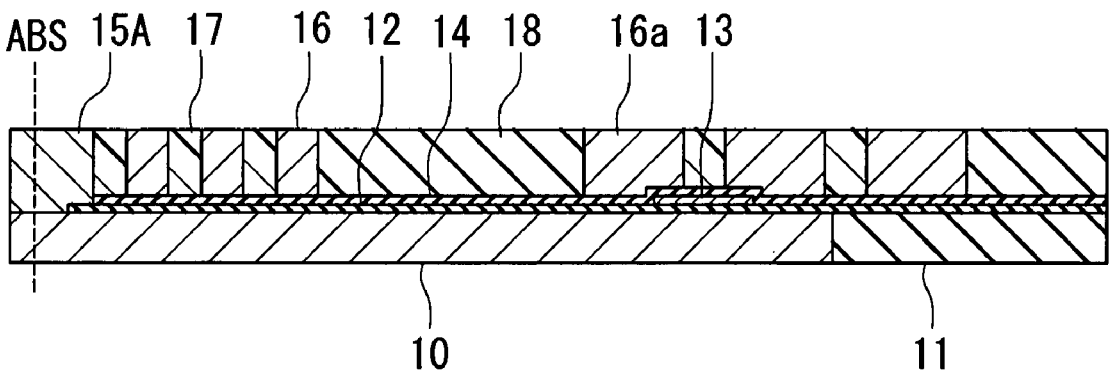
FIG. 9 is a cross-sectional view illustrating a step that follows the step of FIG. 8.

FIG. 9 illustrates the next step. In this step, first, the insulating layer 18 is formed on the entire top surface of the stack of layers of FIG. 8. Next, the insulating layer 18 is polished by CMP, for example, so that the first layer 15A and the coil 16 are exposed, and the top surfaces of the first layer 15A, the coil 16 and the insulating layer 18 are thereby flattened.

Figure 10:
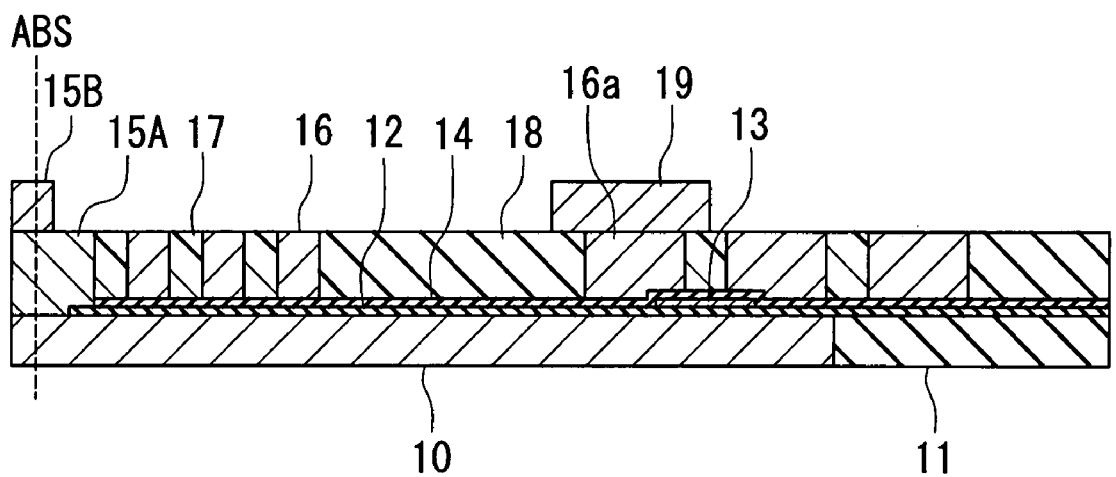
FIG. 10 is a cross-sectional view illustrating a step that follows the step of FIG. 9.

Next, as illustrated in FIG. 10, the second layer 15B and the connecting layer 19 are formed by frame plating, for example.

Figure 11:
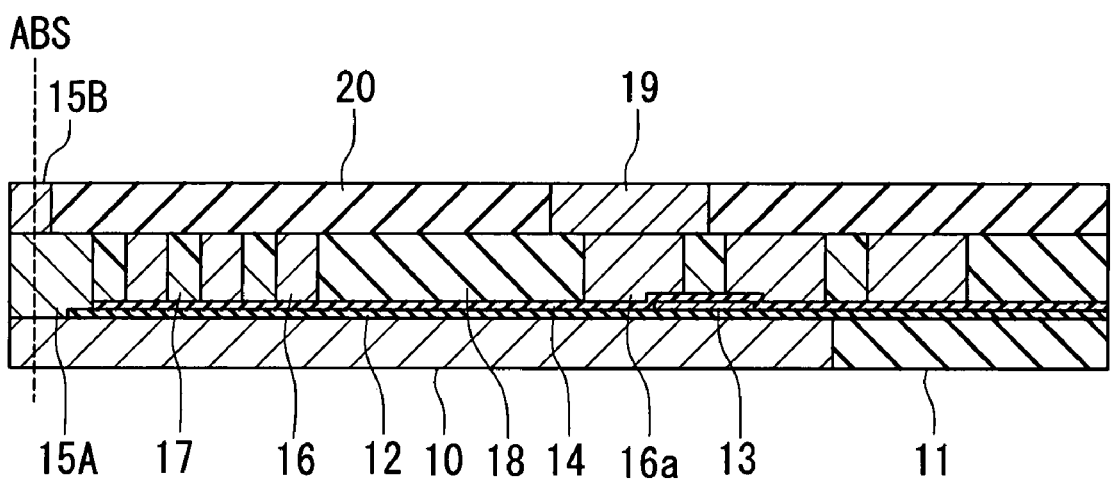
FIG. 11 is a cross-sectional view illustrating a step that follows the step of FIG. 10.

FIG. 11 illustrates the next step. In this step, first, the insulating layer 20 is formed on the entire top surface of the stack of layers of FIG. 10. Next, the insulating layer 20 is polished by CMP, for example, so that the second layer 15B and the connecting layer 19 are exposed, and the top surfaces of the second layer 15B, the connecting layer 19 and the insulating layer 20 are thereby flattened.

Figure 12:
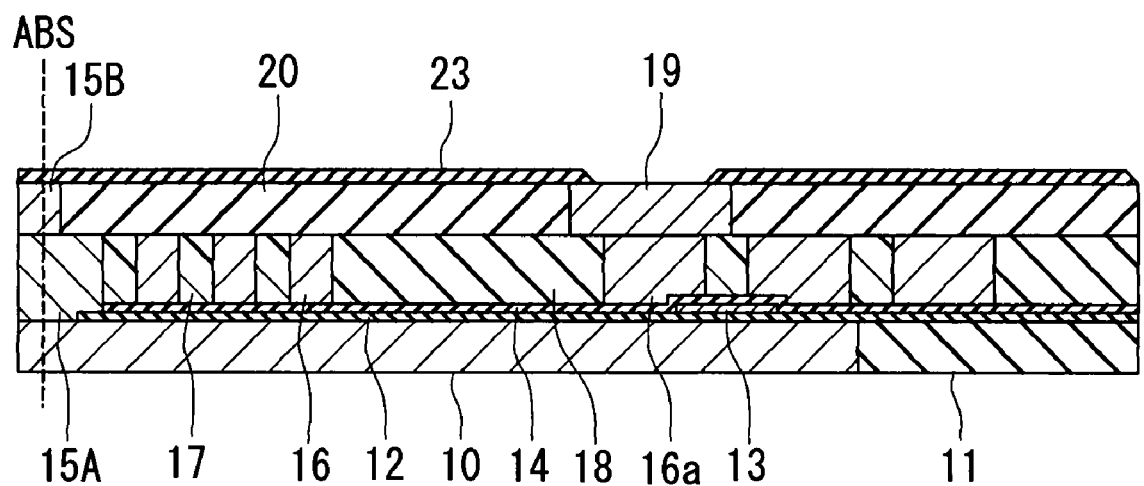
FIG. 12 is a cross-sectional view illustrating a step that follows the step of FIG. 11.

FIG. 12 illustrates the next step. In this step, first, the first gap layer 23 is formed on the entire top surface of the stack of layers of FIG. 11. Next, an opening is formed by ion milling, for example, in a region of the first gap layer 23 corresponding to the top surface of the connecting layer 19.

Figure 13:
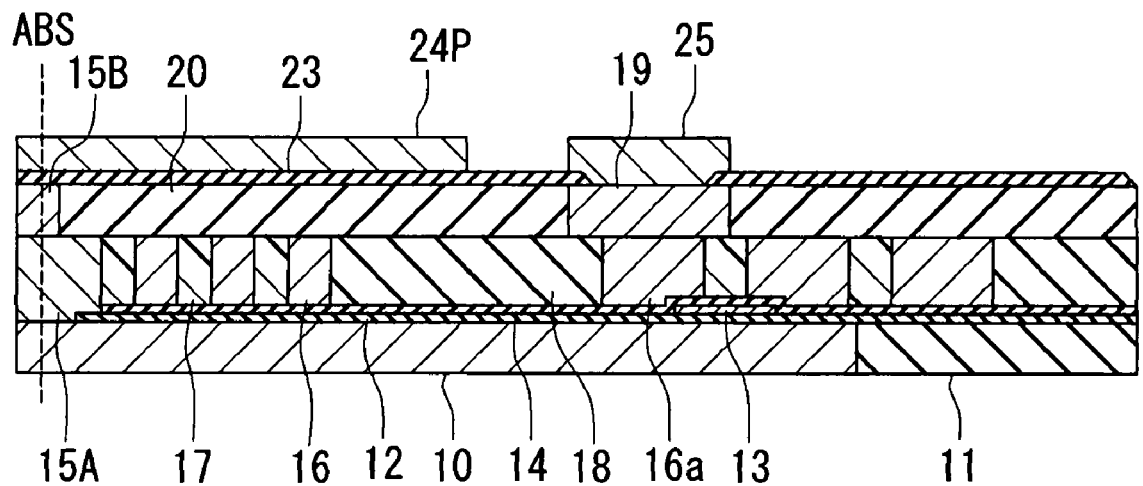
FIG. 13 is a cross-sectional view illustrating a step that follows the step of FIG. 12.

Next, as illustrated in FIG. 13, a magnetic layer 24P, which is to become the pole layer 24 later, and the connecting layer 25 are formed by frame plating.

Figure 14:
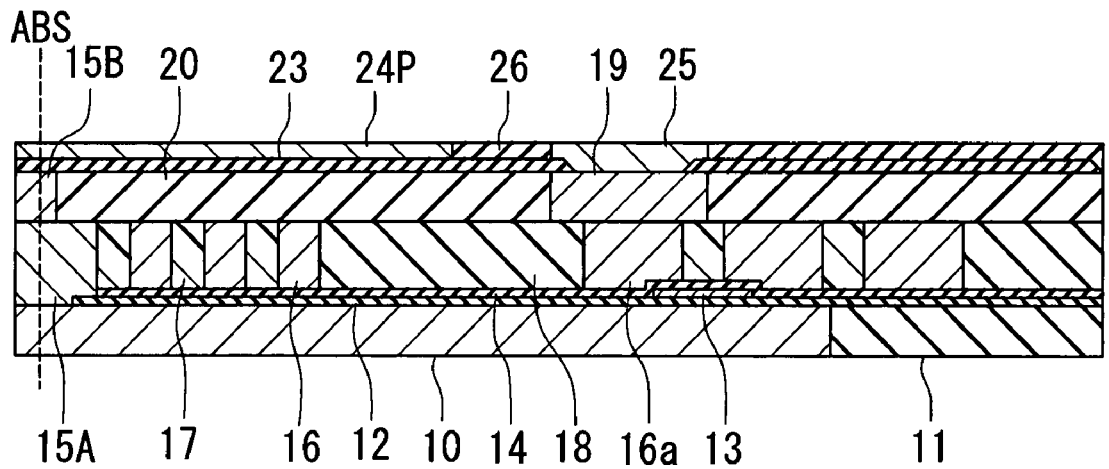
FIG. 14 is a cross-sectional view illustrating a step that follows the step of FIG. 13.

FIG. 14 illustrates the next step. In this step, first, the insulating layer 26 is formed on the entire top surface of the stack of layers of FIG. 13. Next, the insulating layer 26, the magnetic layer 24P and the connecting layer 25 are polished by CMP, for example, so that the magnetic layer 24P and the connecting layer 25 are exposed and these layers achieve desired thicknesses, and the top surfaces of the layers 26, 24P and 25 are thereby flattened.

Figure 15:
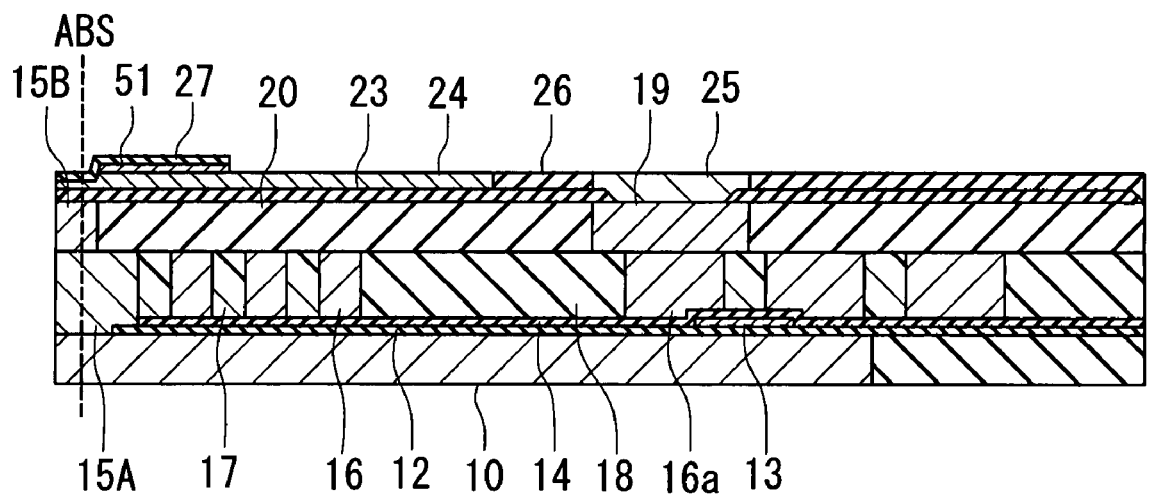
FIG. 15 is a cross-sectional view illustrating a step that follows the step of FIG. 14.

FIG. 15 illustrates the next step. In this step, first, the nonmagnetic layer 51 is formed on part of the top surface of the stack of layers of FIG. 14. Next, the magnetic layer 24P is partially etched using the nonmagnetic layer 51 as a mask, so that the first portion A1, the second portion A2 and the third portion A3 are formed in the top surface of the magnetic layer 24P and the magnetic layer 24P thereby becomes the pole layer 24. Next, the second gap layer 27 is formed on the pole layer 24 and the nonmagnetic layer 51. Next, the nonmagnetic layer 51 and the second gap layer 27 are selectively etched such that the top surface of the connecting layer 25 and part of the top surface of the pole layer 24 away from the medium facing surface 40 are exposed. A series of steps for forming the pole layer 24, the nonmagnetic layer 51 and the second gap layer 27 will be described in more detail later.

Figure 16:
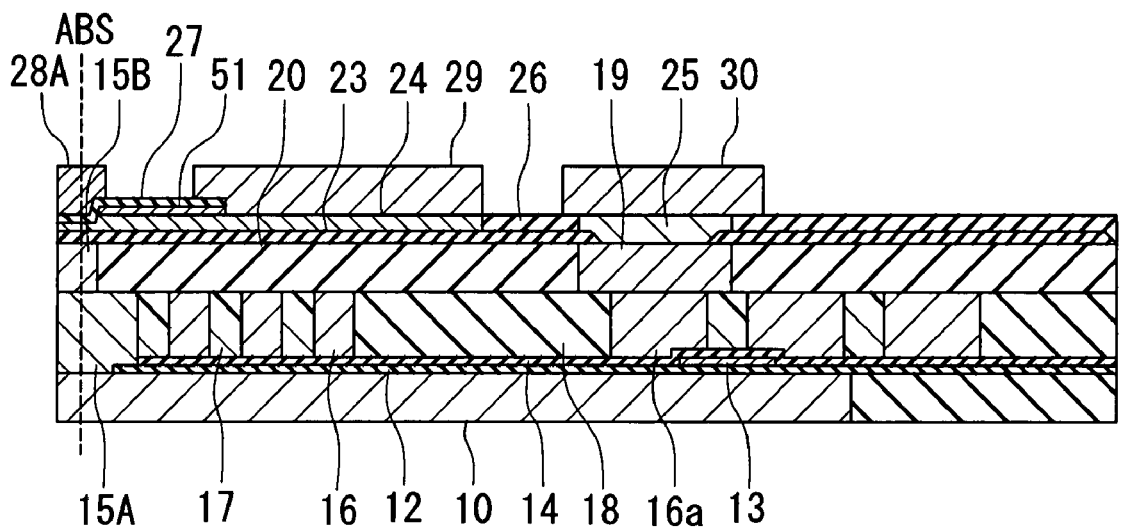
FIG. 16 is a cross-sectional view illustrating a step that follows the step of FIG. 15.

Next, as illustrated in FIG. 16, the first layer 28A of the second shield 28, the yoke layer 29, and the connecting layer 30 are formed by frame plating, for example.

Figure 17:
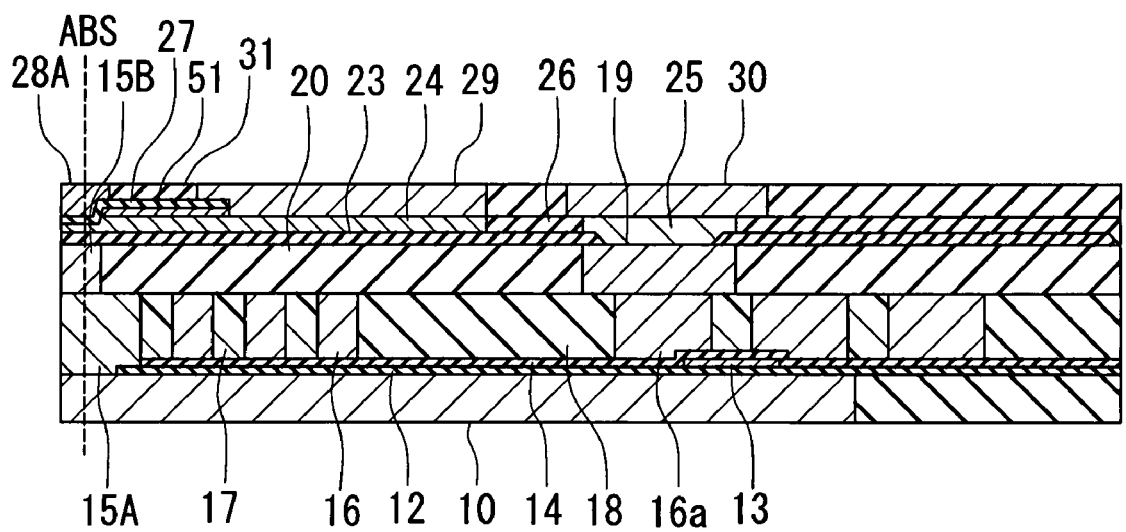
FIG. 17 is a cross-sectional view illustrating a step that follows the step of FIG. 16.

FIG. 17 illustrates the next step. In this step, first, the insulating layer 31 is formed on the entire top surface of the stack of layers of FIG. 16. Next, the insulating layer 31, the first layer 28A, the yoke layer 29 and the connecting layer 30 are polished by CMP, for example, so that the first layer 28A, the yoke layer 29 and the connecting layer 30 are exposed and these layers achieve desired thicknesses, and the top surfaces of the layers 31, 28A, 29 and 30 are thereby flattened.

Figure 18:
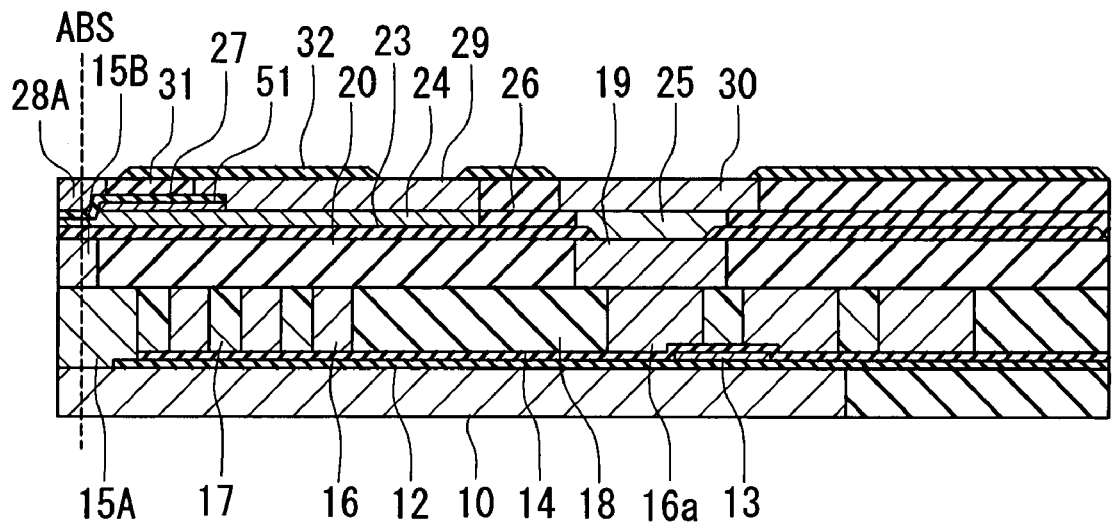
FIG. 18 is a cross-sectional view illustrating a step that follows the step of FIG. 17.

Next, as illustrated in FIG. 18, the insulating layer 32 is formed on the yoke layer 29 and the insulating layer 31. The insulating layer 32 may be formed by partially etching an insulating film formed on the entire top surface of the stack of layers of FIG. 17 by ion milling, for example, or may be formed by lift-off.

Figure 19:
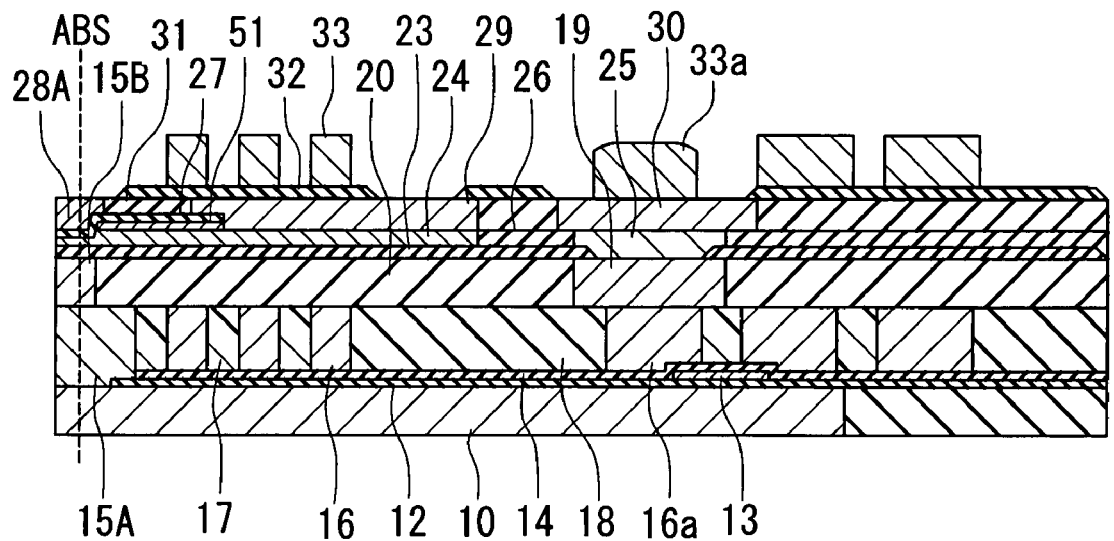
FIG. 19 is a cross-sectional view illustrating a step that follows the step of FIG. 18.
Figure 20:
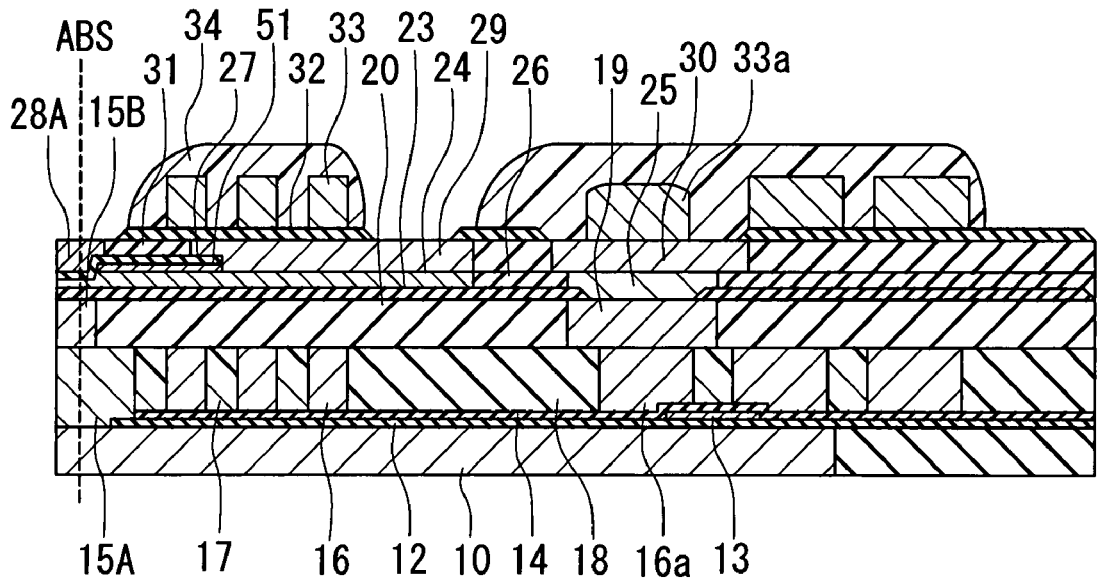
FIG. 20 is a cross-sectional view illustrating a step that follows the step of FIG. 19.
Figure 21:
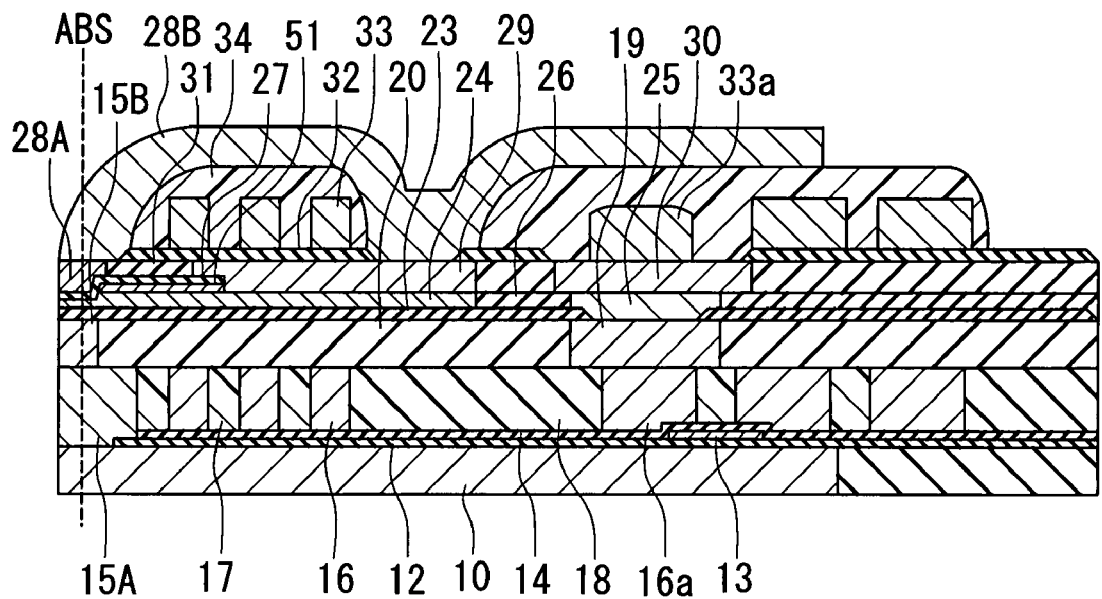
FIG. 21 is a cross-sectional view illustrating a step that follows the step of FIG. 20.

Next, as illustrated in FIG. 19, the coil 33 is formed. The connecting portion 33a of the coil 33 is disposed on the connecting layer 30, and the other portion of the coil 33 is disposed on the insulating layer 32. Next, as illustrated in FIG. 20, the insulating layer 34 is formed to cover the coil 33. Next, as illustrated in FIG. 21, the second layer 28B is formed by frame plating, for example.

Next, as illustrated in FIG. 2, the overcoat layer 35 is formed. Next, wiring and terminals and so on are formed on the overcoat layer 35. In the embodiment, two terminals connected to the MR element 5, two terminals connected to the coils 16 and 33, and two terminals connected to the heater 13 are formed on the overcoat layer 35. The substructure is thus fabricated.

Next, as previously described, the substructure is cut, the surface to be the medium facing surface 40 is lapped to form the medium facing surface 40, flying rails are formed in the medium facing surface 40, and the slider including the magnetic head is thus completed.

Reference is now made to FIG. 22 to FIG. 25 to describe in more detail the series of steps for forming the pole layer 24, the nonmagnetic layer 51 and the second gap layer 27 that has been described with reference to FIG. 15.

Figure 22:
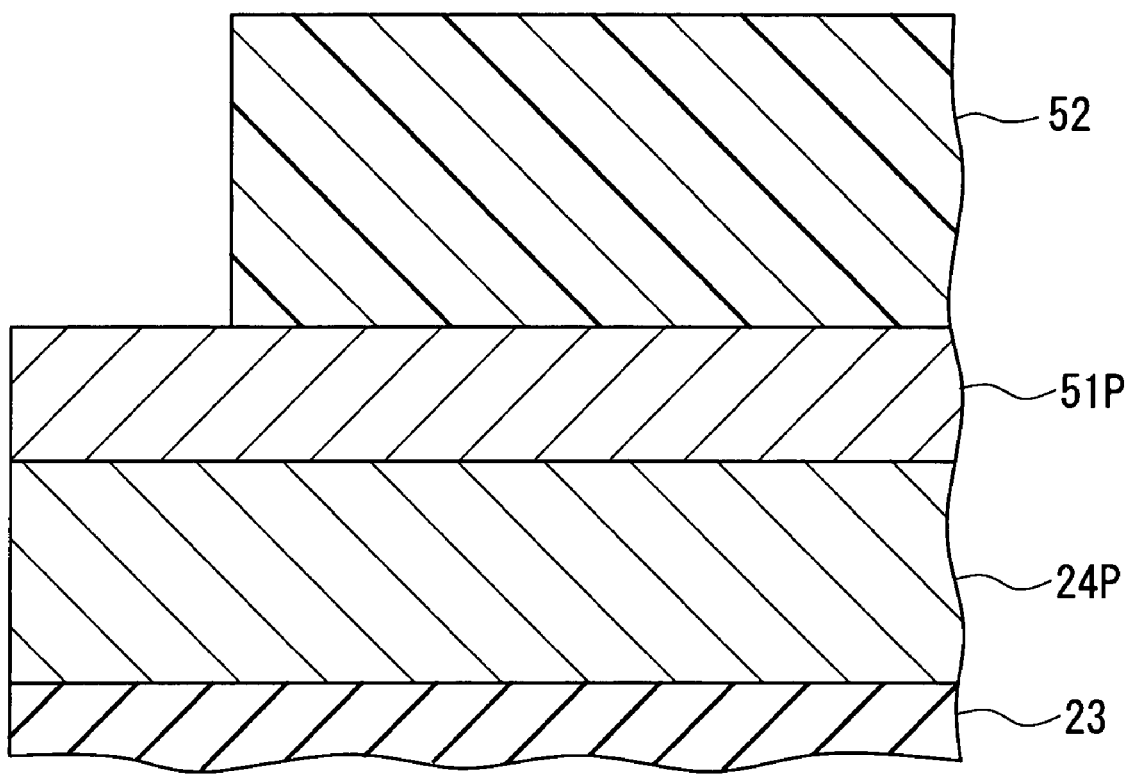
FIG. 22 is a cross-sectional view illustrating a step for forming the pole layer, a nonmagnetic layer and a second gap layer of the embodiment of the invention.

FIG. 22 illustrates a step for forming the pole layer 24, the nonmagnetic layer 51 and the second gap layer 27. In this step, first, a nonmagnetic film 51P, which is to become the pole layer 24 later by undergoing partial etching, is formed on the magnetic layer 24P by sputtering, for example. Next, an etching mask 52 is formed on the nonmagnetic film 51P. The etching mask 52 is formed by, for example, forming a photoresist layer on the nonmagnetic layer 24P and then patterning the photoresist layer by photolithography. The etching mask 52 covers a portion of the nonmagnetic film 51P that is to become the nonmagnetic layer 51.

Figure 23:
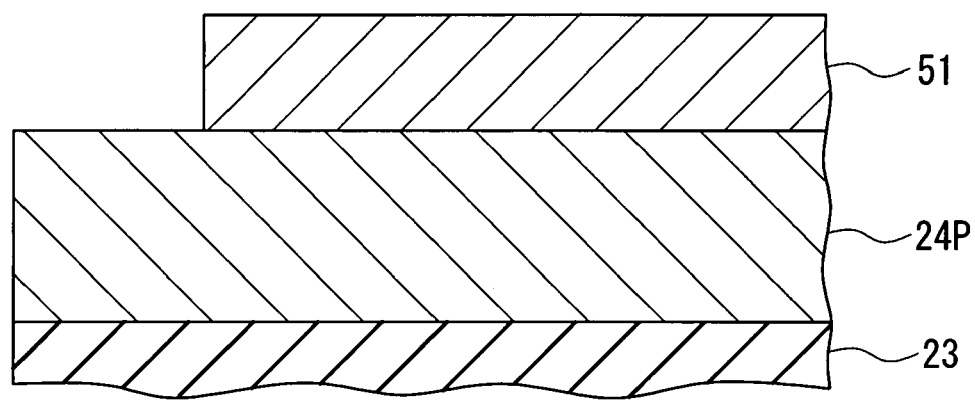
FIG. 23 is a cross-sectional view illustrating a step that follows the step of FIG. 22.

Next, as illustrated in FIG. 23, the other portion of the nonmagnetic film 51P not covered with the etching mask 52 is etched away by ion milling or reactive ion etching, for example. The remainder of the nonmagnetic film 51P thus becomes the nonmagnetic layer 51. If any portion of the etching mask 52 remains after the etching, it is removed.

Figure 24:
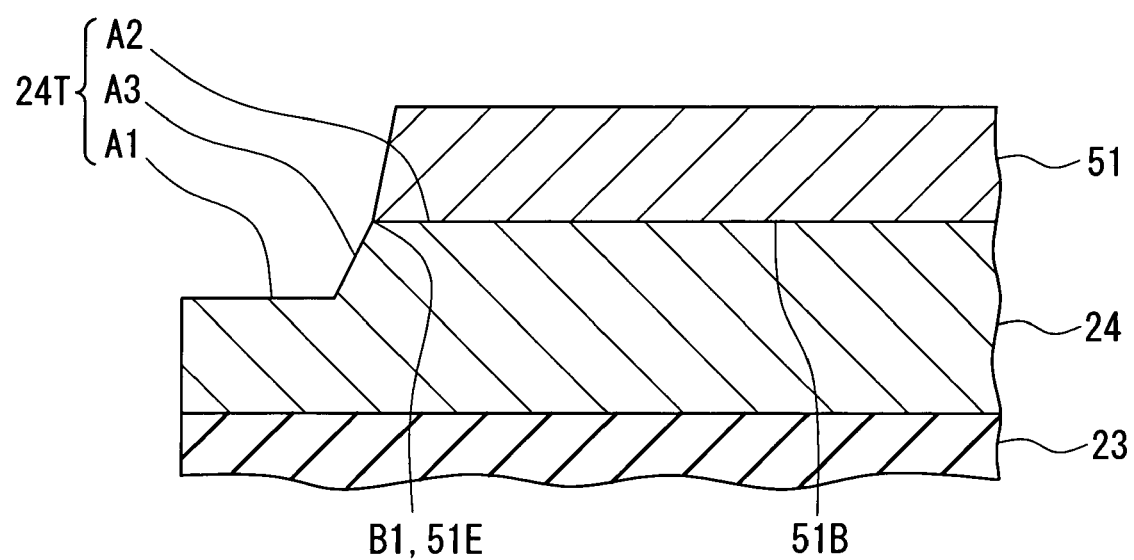
FIG. 24 is a cross-sectional view illustrating a step that follows the step of FIG. 23.

Next, as illustrated in FIG. 24, the magnetic layer 24P is partially etched by ion milling or reactive ion etching, for example, using the nonmagnetic layer 51 as a mask. As a result, the first portion A1, the second portion A2 and the third portion A3 are formed in the top surface of the magnetic layer 24P, and the magnetic layer 24P thereby becomes the pole layer 24. Through the partial etching of the magnetic layer 24P using the nonmagnetic layer 51 as the mask as described above, the surface 51B of the nonmagnetic layer 51 touching the second portion A2 is provided with an edge 51E located at the boundary B1 between the second portion A2 and the third portion A3. In the embodiment, the nonmagnetic layer 51 is allowed to remain after this etching. The material of the nonmagnetic layer 51 to be selected is therefore such one that the etching rate thereof is lower than that of the magnetic layer 24P when the magnetic layer 24P is partially etched.

Figure 25:
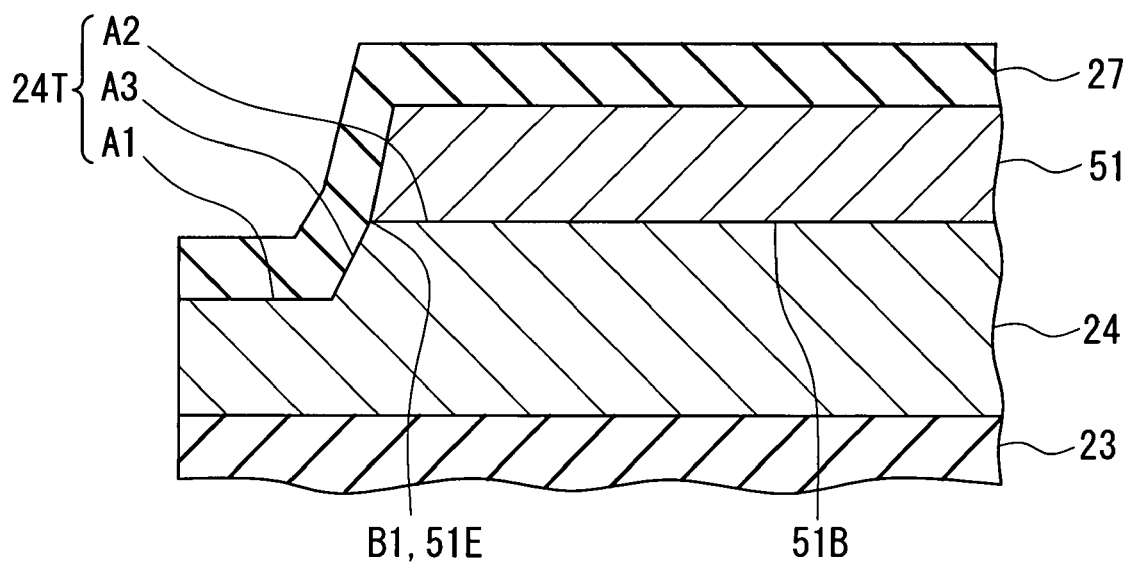
FIG. 25 is a cross-sectional view illustrating a step that follows the step of FIG. 24.

Next, as illustrated in FIG. 25, the second gap layer 27 is formed on the pole layer 24 and the nonmagnetic layer 51. Next, as described with reference to FIG. 15, the nonmagnetic layer 51 and the second gap layer 27 are selectively etched such that the top surface of the connecting layer 25 and part of the top surface of the pole layer 24 away from the medium facing surface 40 are exposed.

As a method for forming the second gap layer 27, sputtering or chemical vapor deposition (hereinafter referred to as CVD) is employed, for example. As the method for forming the second gap layer 27, it is particularly preferred to employ a type of CVD in which formation of a single atomic layer is repeated, that is, a technique called atomic layer deposition. This makes it possible to form the second gap layer 27 with excellent step coverage on the surface having a difference in level. As a result, by using this method, it is possible to prevent the pole layer 24 and the second shield 28 from touching each other in the neighborhood of the medium facing surface 40, and it is therefore possible to achieve stable write characteristics of the write head.

As described so far, in the embodiment, the top surface 24T of the pole layer 24 includes the first portion A1 and the second portion A2 with a difference in height therebetween, and the third portion A3 that connects the first portion A1 and the second portion A2 to each other. The first portion A1 has the edge located in the medium facing surface 40. The second portion A2 is located farther from the medium facing surface 40 and farther from the substrate 1 than the first portion A1. As a result, it is possible to introduce magnetic flux of great magnitude to the medium facing surface 40 through the pole layer 24 while preventing the problems resulting from the skew by reducing the thickness of the track width defining portion 24A taken in the medium facing surface 40.

In the embodiment, the nonmagnetic layer 51 is provided between the second portion A2 and the second gap layer 27. Therefore, in the embodiment, the distance WGB between the second portion A2 and the bottom surface of the first layer 28A taken in the direction of thickness of the nonmagnetic layer 51 is greater than the distance (WG) between the end face of the pole layer 24 and the end face of the second shield 28 in the medium facing surface 40. As a result, according to the embodiment, it is possible to suppress leakage of magnetic flux from the pole layer 24 to the second shield 28. Consequently, according to the embodiment, it is possible to introduce magnetic flux of greater magnitude to the medium facing surface 40 through the pole layer 24 to thereby obtain a greater write magnetic field, compared with a case where the nonmagnetic layer 51 is not provided. Furthermore, according to the embodiment, since it is possible to introduce magnetic flux of greater magnitude to the medium facing surface 40, it is not necessary to greatly reduce the neck height NH and as a result, it is possible to define the track width with precision.

A description will now be made on the results of a first simulation showing that the presence of the nonmagnetic layer 51 between the second portion A2 and the second gap layer 27 as mentioned above contributes to a greater write magnetic field, compared with the case in which the nonmagnetic layer 51 is not provided. In this simulation, write magnetic field intensity was determined on each of a model of a reference magnetic head having such a structure that the nonmagnetic layer 51 is excluded from the magnetic head of the embodiment, and four models of the magnetic head of the embodiment. The four models of the magnetic head of the embodiment are different from each other in thickness MCT of the nonmagnetic layer 51. Here, the write magnetic field intensity of each model to be evaluated is divided by the write magnetic field intensity of the model of the reference magnetic head, and the value thus obtained is defined as a normalized write magnetic field intensity. It can be said that the greater the normalized write magnetic field intensity, the better the write characteristics.

Figure 26:
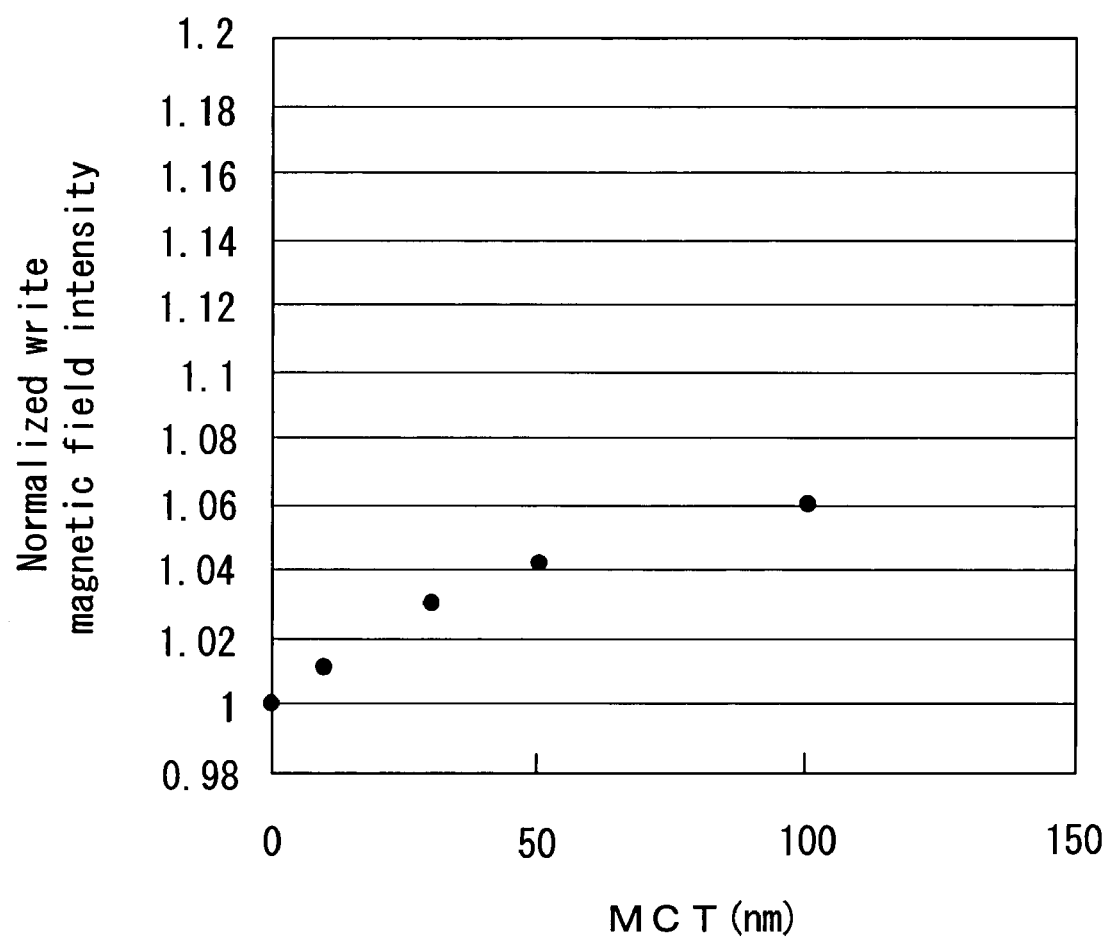
FIG. 26 is a plot of the results of a first simulation for explaining the effects of the magnetic head of the embodiment of the invention.

FIG. 26 is a plot indicating the relationship between the thickness MCT of the nonmagnetic layer 51 and the normalized write magnetic field intensity obtained in the first simulation. On the plot of FIG. 26 the point at which the thickness MCT of the nonmagnetic layer 51 is 0 nm corresponds to the model of the reference magnetic head. The other four points on the plot of FIG. 26 correspond to the four models of the magnetic head of the embodiment. FIG. 26 indicates that a greater write magnetic field is obtained with the magnetic head of the embodiment, compared with the case in which the nonmagnetic layer 51 is not provided. FIG. 26 also indicates that the write magnetic field becomes greater with increasing thickness MCT of the nonmagnetic layer 51.

According to the embodiment, by the presence of the nonmagnetic layer 51 on the second portion A2 of the top surface 24T of the pole layer 24, it is possible to precisely control the position of the boundary B1 between the second portion A2 and the third portion A3. Results of an experiment that indicate this will now be described.

Figure 27:
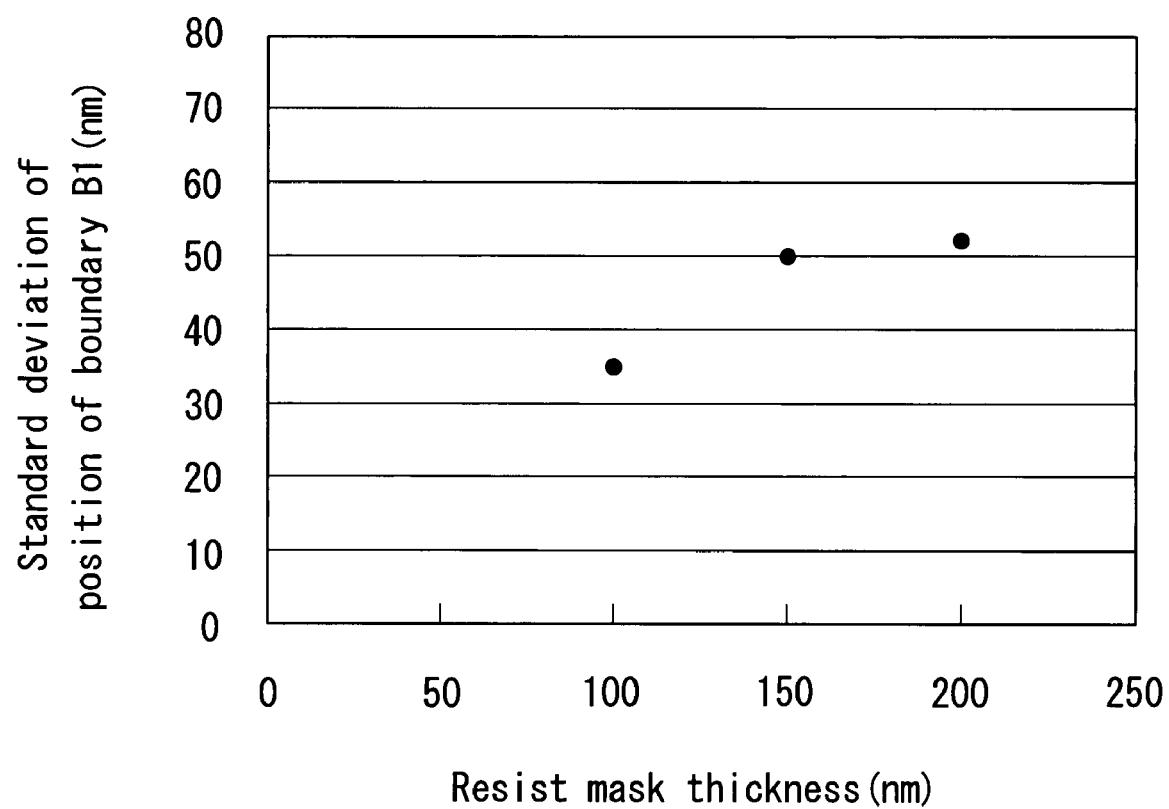
FIG. 27 is a plot of experimental results for explaining the effects of the magnetic head of the embodiment of the invention.

In this experiment, a number of samples of the pole layer 24 were prepared through etching the magnetic layer 24P by using a resist mask made of photoresist in place of the nonmagnetic layer 51. Then, the relationship between the thickness of the resist mask and the standard deviation of the position of the boundary B1 was determined on these samples. Here, three types of thicknesses were predetermined for the resist mask and measurements were performed on 40 samples each for the three types to thereby determine the standard deviation of the position of the boundary B1. FIG. 27 shows the results.

Figure 28:
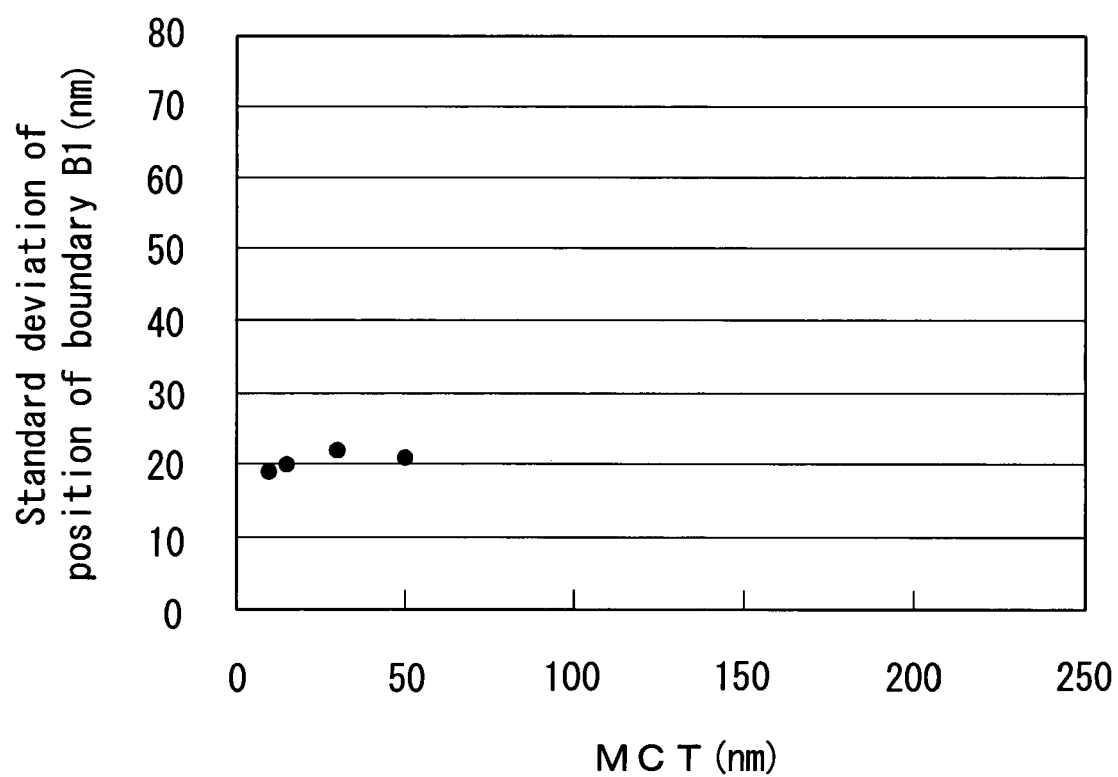
FIG. 28 is a plot of experimental results for explaining the effects of the magnetic head of the embodiment of the invention.

In the experiment, a number of other samples of the pole layer 24 were also prepared through etching the magnetic layer 24P by using the nonmagnetic layer 51 as a mask. Then, the relationship between the thickness MCT of the nonmagnetic layer 51 and the standard deviation of the position of the boundary B1 was determined on these samples. Here, four types of thicknesses MCT were predetermined for the nonmagnetic layer 51 and measurements were performed on 40 samples each for the four types to thereby determine the standard deviation of the position of the boundary B1. FIG. 28 shows the results.

It can be said that the smaller the standard deviation of the position of the boundary B1, the more precisely the position of the boundary B1 can be controlled. Comparison between FIG. 27 and FIG. 28 shows that a smaller standard deviation of the position of the boundary B1 is obtained in the case where the pole layer 24 is formed through etching the magnetic layer 24P by using as a mask the nonmagnetic layer 51 that is to remain on the top surface 24T of the pole layer 24, compared with the case in which the pole layer 24 is formed through etching the magnetic layer 24P by using a resist mask in place of the nonmagnetic layer 51. As the results of this experiment indicate, it is possible, according to the embodiment, to control the position of the boundary B1 with high precision. The position of the boundary B1 has an influence on the magnitude of write magnetic field. The embodiment therefore makes it possible to suppress variations in magnitude of write magnetic field resulting from variations in position of the boundary B1.

In the embodiment, the thickness MCT of the nonmagnetic layer 51 is equal to or greater than the difference in height SH between the first portion A1 and the second portion A2. According to the embodiment, this makes it possible to suppress variations in write magnetic field intensity occurring in response to variations in throat height TH. Results of a second to a fifth simulation that indicate this will now be described.

Figure 29:
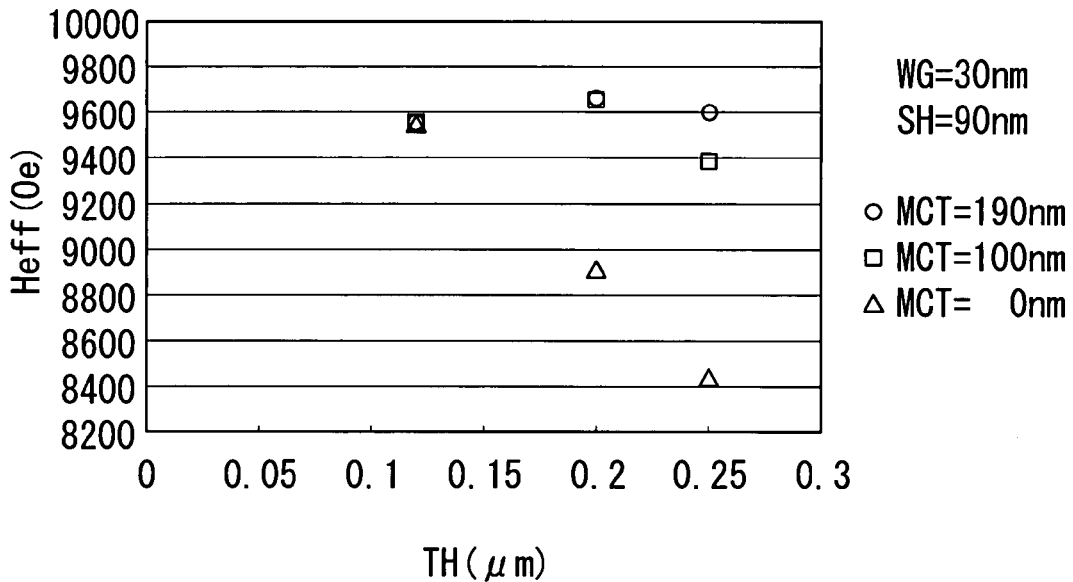
FIG. 29 is a plot of the results of a second simulation for explaining the effects of the magnetic head of the embodiment of the invention.

In the second simulation, write magnetic field intensity Heff (Oe) was determined on each of nine models of magnetic heads having WG of 30 nm and SH of 90 nm, and having different combinations of MCT and TH. Note that 1 Oe is equal to 79.6 A/m. The simulation was performed with three types of MCT, that is, 190 nm, 100 nm and 0 nm, and three types of TH, that is, 0.12 μm, 0.2 μm and 0.25 μm. FIG. 29 shows the results of the second simulation. FIG. 29 is a plot indicating the relationship between TH and Heff for the above-mentioned nine models. Circles, squares and triangles on the plot of FIG. 29 represent data obtained when MCT was 190 nm, 100 nm and 0 nm, respectively.

Figure 30:
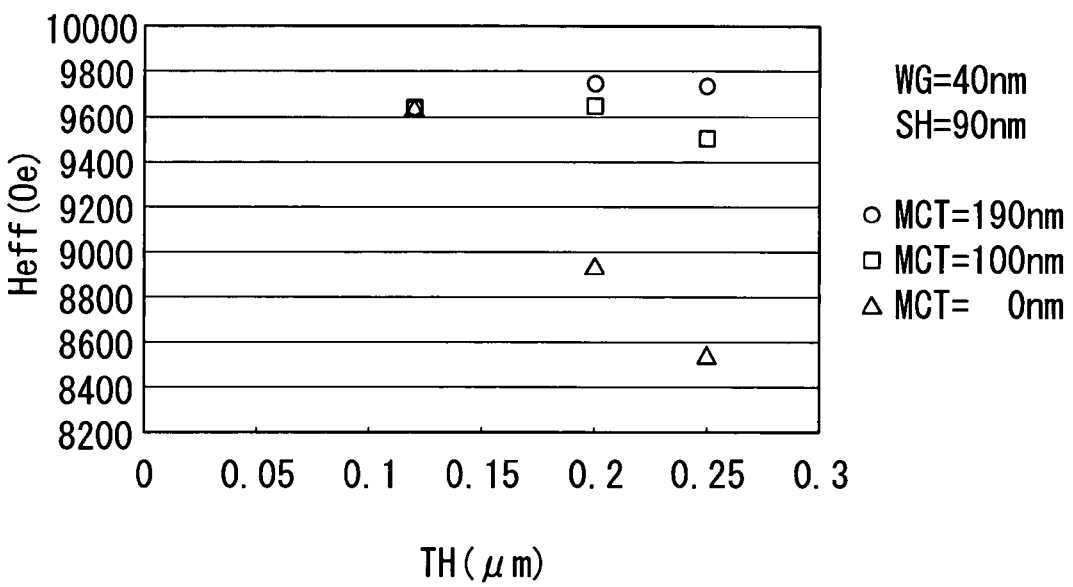
FIG. 30 is a plot of the results of a third simulation for explaining the effects of the magnetic head of the embodiment of the invention.

In the third simulation, Heff (Oe) was determined on each of nine models of magnetic heads having WG of 40 nm and SH of 90 nm, and having different combinations of MCT and TH. The simulation was performed with three types of MCT, that is, 190 nm, 100 nm and 0 nm, and three types of TH, that is, 0.12 μm, 0.2 μm and 0.25 μm. FIG. 30 shows the results of the third simulation. FIG. 30 is a plot indicating the relationship between TH and Heff for the above-mentioned nine models. Circles, squares and triangles on the plot of FIG. 30 represent data obtained when MCT was 190 nm, 100 nm and 0 nm, respectively.

Figure 31:
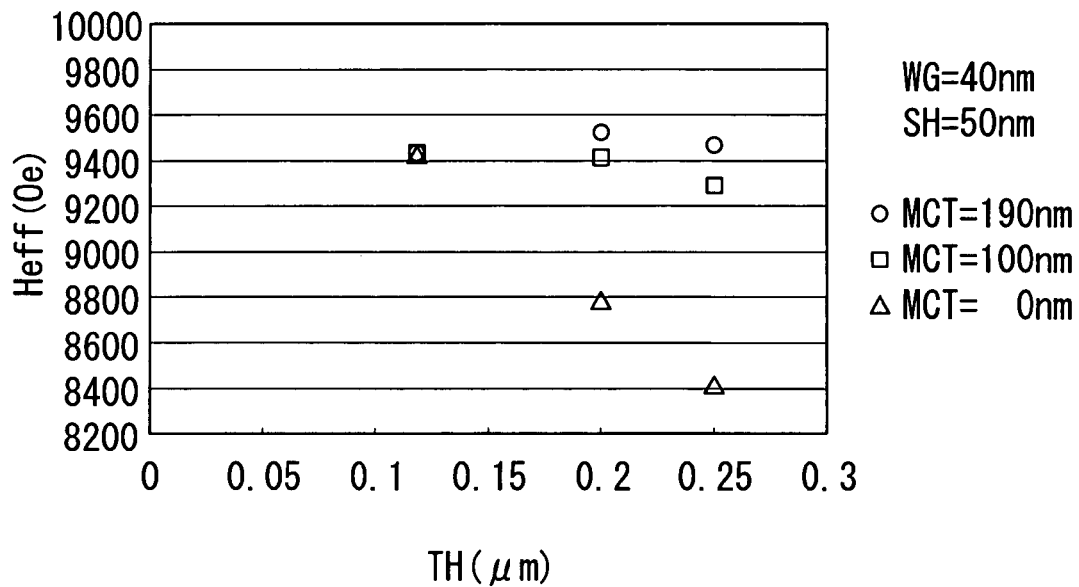
FIG. 31 is a plot of the results of a fourth simulation for explaining the effects of the magnetic head of the embodiment of the invention.

In the fourth simulation, Heff (Oe) was determined on each of nine models of magnetic heads having WG of 40 nm and SH of 50 nm, and having different combinations of MCT and TH. The simulation was performed with three types of MCT, that is, 190 nm, 100 nm and 0 nm, and three types of TH, that is, 0.12 μm, 0.2 μm and 0.25 μm. FIG. 31 shows the results of the fourth simulation. FIG. 31 is a plot indicating the relationship between TH and Heff for the above-mentioned nine models. Circles, squares and triangles on the plot of FIG. 31 represent data obtained when MCT was 190 nm, 100 nm and 0 nm, respectively.

Figure 32:
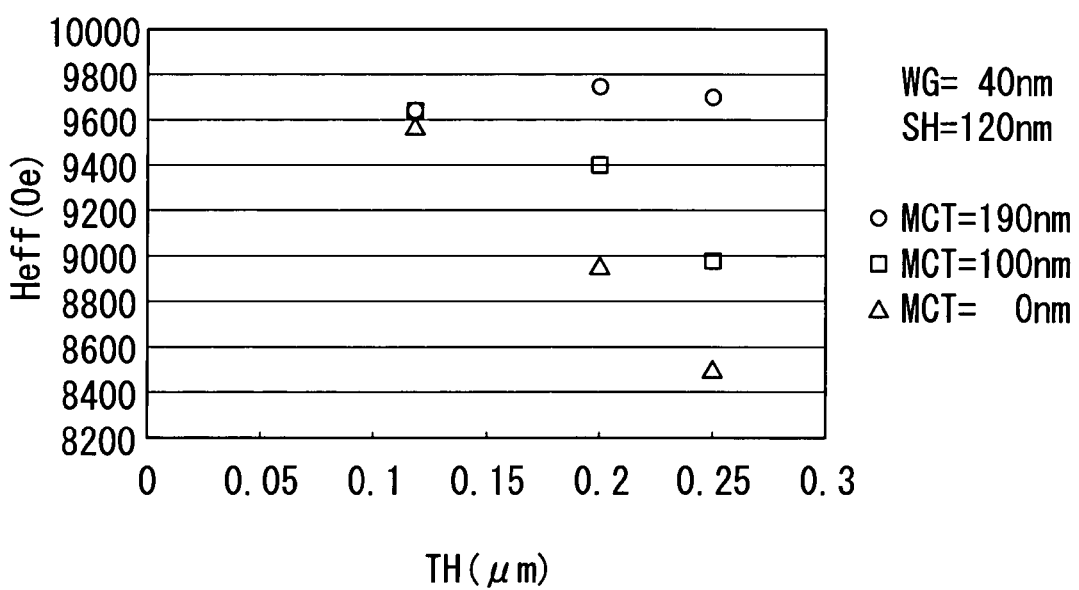
FIG. 32 is a plot of the results of a fifth simulation for explaining the effects of the magnetic head of the embodiment of the invention.

In the fifth simulation, Heff (Oe) was determined on each of nine models of magnetic heads having WG of 40 nm and SH of 120 nm, and having different combinations of MCT and TH. The simulation was performed with three types of MCT, that is, 190 nm, 100 nm and 0 nm, and three types of TH, that is, 0.12 μm, 0.2 μm and 0.25 μm. FIG. 32 shows the results of the fifth simulation. FIG. 32 is a plot indicating the relationship between TH and Heff for the above-mentioned nine models. Circles, squares and triangles on the plot of FIG. 32 represent data obtained when MCT was 190 nm, 100 nm and 0 nm, respectively.

The results of the second to the fifth simulation shown in FIG. 29 to FIG. 32 indicate the following. When the thickness MCT of the nonmagnetic layer 51 is 0 nm, the write magnetic field intensity Heff decreases as the throat height TH increases. However, as the thickness MCT of the nonmagnetic layer 51 increases, a variation in write magnetic field intensity Heff occurring in response to a variation in throat height TH becomes smaller.

Figure 33:
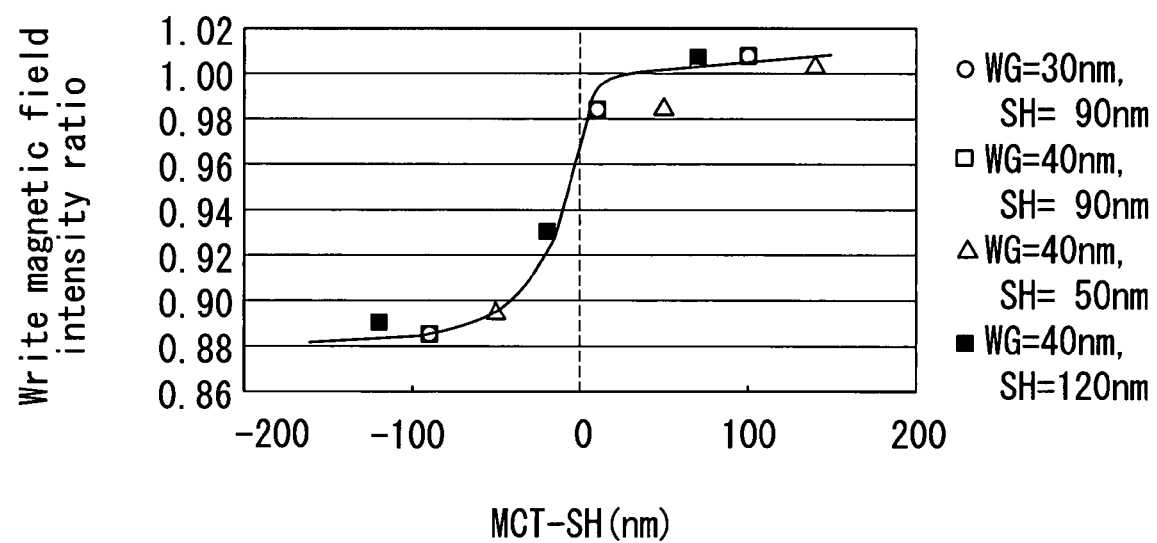
FIG. 33 is a plot for explaining the effects of the magnetic head of the embodiment of the invention based on the results of the second to the fifth simulation.

FIG. 33 is a plot showing the relationship between MCT-SH (nm) and write magnetic field intensity ratio defined below, based on the results of the second to the fifth simulation. The write magnetic field intensity ratio defined here is a value obtained by dividing the write magnetic field intensity obtained when TH is 0.25 µm by the write magnetic field intensity obtained when TH is 0.12 µm under a condition that the combination of values of WG, SH and MCT is the same. It can be said that the closer to 1 is the write magnetic field intensity ratio, the smaller is a variation in write magnetic field intensity occurring in response to a variation in TH.

Circles on the plot of FIG. 33 represent data obtained when WG is 30 nm and SH is 90 nm. Open squares on the plot of FIG. 33 represent data obtained when WG is 40 nm and SH is 90 nm. Triangles on the plot of FIG. 33 represent data obtained when WG is 40 nm and SH is 50 nm. Solid filled squares on the plot of FIG. 33 represent data obtained when WG is 40 nm and SH is 120 nm.

FIG. 33 indicates that, when MCT-SH is equal to or greater than zero, that is, when MCT is equal to or greater than SH, the write magnetic field intensity ratio gets closer to 1. According to the embodiment, since MCT is equal to or greater the SH, it is possible to suppress variations in write magnetic field intensity occurring in response to variations in throat height TH.

Figure 34:
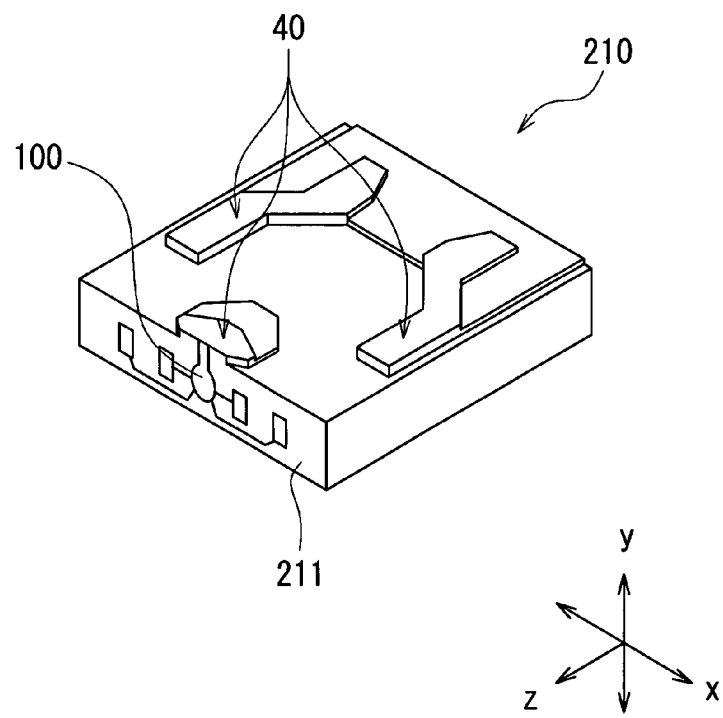
FIG. 34 is a perspective view illustrating an example of appearance of a slider including the magnetic head of the embodiment of the invention.

A head assembly and a magnetic disk drive of the embodiment will now be described. Reference is now made to FIG. 34 to describe a slider 210 incorporated in the head assembly. In the magnetic disk drive, the slider 210 is placed to face toward a magnetic disk platter that is a circular-plate-shaped recording medium to be driven to rotate. The slider 210 has a base body 211 made up mainly of the substrate 1 and the overcoat layer 35 of FIG. 2. The base body 211 is nearly hexahedron-shaped. One of the six surfaces of the base body 211 faces toward the magnetic disk platter. The medium facing surface 40 is formed in this one of the surfaces. When the magnetic disk platter rotates in the z direction of FIG. 34, an airflow passes between the magnetic disk platter and the slider 210, and a lift is thereby generated below the slider 210 in the y direction of FIG. 34 and exerted on the slider 210. The slider 210 flies over the surface of the magnetic disk platter by means of the lift. The x direction of FIG. 34 is across the tracks of the magnetic disk platter. The thin-film magnetic head 100 of the embodiment is formed near the air-outflow-side end (the end located at the lower left of FIG. 34) of the slider 210.

Figure 35:
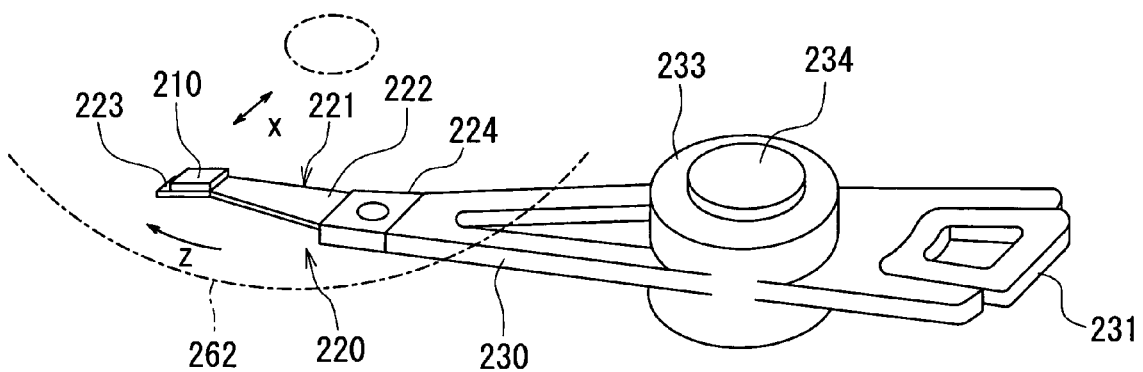
FIG. 35 is a perspective view of a head arm assembly of the embodiment of the invention.

Reference is now made to FIG. 35 to describe the head assembly of the embodiment. The head assembly of the embodiment has the slider 210 and a supporter that flexibly supports the slider 210. Modes of this head assembly include a head gimbal assembly and a head arm assembly described below.

The head gimbal assembly 220 will be first described. The head gimbal assembly 220 has the slider 210 and a suspension 221 as the supporter that flexibly supports the slider 210. The suspension 221 has: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms wherein the head gimbal assembly 220 is attached to each of the arms is called a head stack assembly.

FIG. 35 illustrates the head arm assembly of the embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 36:
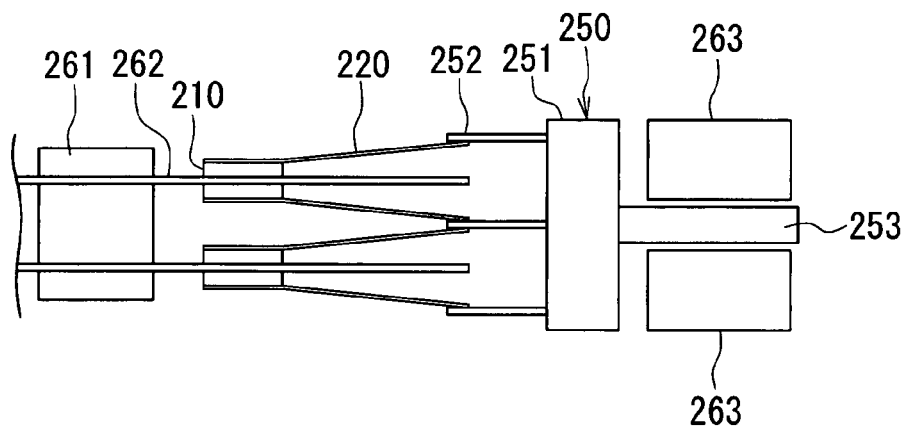
FIG. 36 is an explanatory view for illustrating a main part of a magnetic disk drive of the embodiment of the invention.
Figure 37:
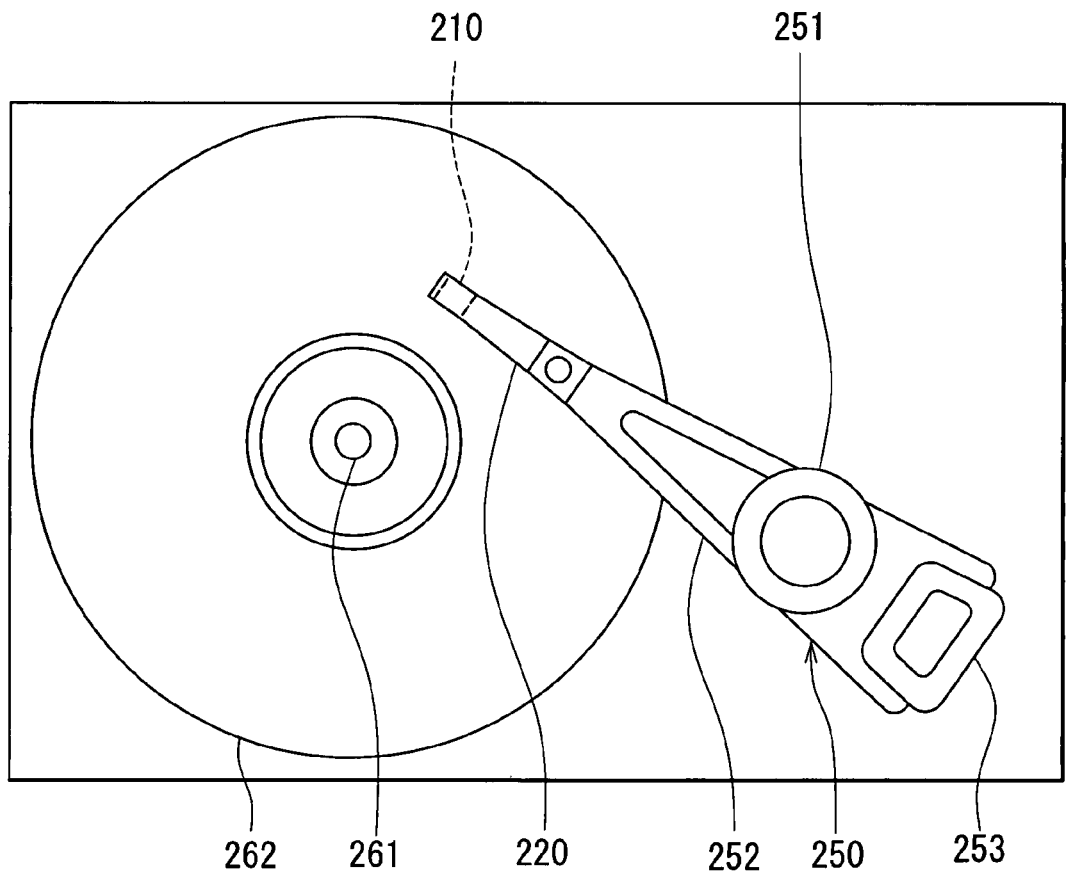
FIG. 37 is a top view of the magnetic disk drive of the embodiment of the invention.

Reference is now made to FIG. 36 and FIG. 37 to describe an example of the head stack assembly and the magnetic disk drive of the embodiment. FIG. 36 is an explanatory view illustrating a main part of the magnetic disk drive, and FIG. 37 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between respective adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention, and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The magnetic head incorporated in the slider 210 writes data on the magnetic disk platter 262 by using the write head, and reads data stored on the magnetic disk platter 262 by using the read head.

The head assembly and the magnetic disk drive of the embodiment exhibit effects similar to those of the magnetic head of the embodiment described previously.

The present invention is not limited to the foregoing embodiment but various modifications are possible. For example, while the embodiment has been described with reference to a magnetic head having a structure in which the read head is formed on the base body and the write head is stacked on the read head, the read and write heads may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A magnetic head for perpendicular magnetic recording comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a shield made of a magnetic material and having an end face located in the medium facing surface at a position forward of the end face of the pole layer along a direction of travel of the recording medium;

a gap layer made of a nonmagnetic material, disposed between the shield and the pole layer and having an end face located in the medium facing surface; and a substrate on which the coil, the pole layer, the gap layer and the shield are stacked, the pole layer being located closer to the substrate than the shield, wherein:

the pole layer has a top surface that is farther from the substrate; and the top surface of the pole layer includes: a first portion and a second portion with a difference in height therebetween; and a third portion that connects the first portion and the second portion to each other, the first portion having an edge located in the medium facing surface, the second portion being located farther from the medium facing surface and farther from the substrate than the first portion, the magnetic head further comprising a nonmagnetic layer made of a nonmagnetic material and disposed between the second portion and the gap layer, wherein:

the nonmagnetic layer has a surface that touches the second portion, the surface having an edge located at a boundary between the second portion and the third portion; and the nonmagnetic layer has a thickness that is equal to or greater than the difference in height between the first portion and the second portion.

2. The magnetic head according to claim 1, wherein the nonmagnetic layer is made of an inorganic insulating material.

3. The magnetic head according to claim 1, wherein the nonmagnetic layer is made of a metallic material.

4. The magnetic head according to claim 1, wherein the shield is connected to the pole layer at a position away from the medium facing surface, and the coil includes a portion that passes through a space surrounded by the pole layer and the shield.

5. The magnetic head according to claim 1, wherein the shield includes a first layer disposed adjacent to the gap layer and a second layer disposed on a side of the first layer opposite to the gap layer, and the first layer has a surface that bends to be opposed to the first portion, the second portion and the third portion with the gap layer disposed in between.

6. A head assembly comprising: a slider including a magnetic head for perpendicular magnetic recording and disposed to face toward a recording medium; and a supporter flexibly supporting the slider, the magnetic head comprising:

a medium facing surface that faces toward the recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a shield made of a magnetic material and having an end face located in the medium facing surface at a position forward of the end face of the pole layer along a direction of travel of the recording medium;

a gap layer made of a nonmagnetic material, disposed between the shield and the pole layer and having an end face located in the medium facing surface; and a substrate on which the coil, the pole layer, the gap layer and the shield are stacked, wherein:

the pole layer is located closer to the substrate than the shield;

the pole layer has a top surface that is farther from the substrate;

the top surface of the pole layer includes: a first portion and a second portion with a difference in height therebetween; and a third portion that connects the first portion and the second portion to each other, the first portion having an edge located in the medium facing surface, the second portion being located farther from the medium facing surface and farther from the substrate than the first portion;

the magnetic head further comprises a nonmagnetic layer made of a nonmagnetic material and disposed between the second portion and the gap layer;

the nonmagnetic layer has a surface that touches the second portion, the surface having an edge located at a boundary between the second portion and the third portion; and the nonmagnetic layer has a thickness that is equal to or greater than the difference in height between the first portion and the second portion.

7. A magnetic disk drive comprising: a slider including a magnetic head for perpendicular magnetic recording and disposed to face toward a recording medium that is driven to rotate; and an alignment device supporting the slider and aligning the slider with respect to the recording medium, the magnetic head comprising:

a medium facing surface that faces toward the recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a shield made of a magnetic material and having an end face located in the medium facing surface at a position forward of the end face of the pole layer along a direction of travel of the recording medium;

a gap layer made of a nonmagnetic material, disposed between the shield and the pole layer and having an end face located in the medium facing surface; and a substrate on which the coil, the pole layer, the gap layer and the shield are stacked, wherein:

the pole layer is located closer to the substrate than the shield;

the pole layer has a top surface that is farther from the substrate;

the top surface of the pole layer includes: a first portion and a second portion with a difference in height therebetween; and a third portion that connects the first portion and the second portion to each other, the first portion having an edge located in the medium facing surface, the second portion being located farther from the medium facing surface and farther from the substrate than the first portion;

the magnetic head further comprises a nonmagnetic layer made of a nonmagnetic material and disposed between the second portion and the gap layer;

the nonmagnetic layer has a surface that touches the second portion, the surface having an edge located at a boundary between the second portion and the third portion; and the nonmagnetic layer has a thickness that is equal to or greater than the difference in height between the first portion and the second portion.

8. A method of manufacturing a magnetic head for perpendicular magnetic recording, the magnetic head comprising:

a medium facing surface that faces toward a recording medium;

a coil that generates a magnetic field corresponding to data to be written on the recording medium;

a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system;

a shield made of a magnetic material and having an end face located in the medium facing surface at a position forward of the end face of the pole layer along a direction of travel of the recording medium;

a gap layer made of a nonmagnetic material, disposed between the shield and the pole layer and having an end face located in the medium facing surface; and a substrate on which the coil, the pole layer, the gap layer and the shield are stacked, wherein:

the pole layer is located closer to the substrate than the shield;

the pole layer has a top surface that is farther from the substrate;

the top surface of the pole layer includes: a first portion and a second portion with a difference in height therebetween; and a third portion that connects the first portion and the second portion to each other, the first portion having an edge located in the medium facing surface, the second portion being located farther from the medium facing surface and farther from the substrate than the first portion;

the magnetic head further comprises a nonmagnetic layer made of a nonmagnetic material and disposed between the second portion and the gap layer;

the nonmagnetic layer has a surface that touches the second portion, the surface having an edge located at a boundary between the second portion and the third portion; and the nonmagnetic layer has a thickness that is equal to or greater than the difference in height between the first portion and the second portion, the method comprising the steps of:

forming a magnetic layer that is to undergo partial etching later to thereby become the pole layer;

forming the nonmagnetic layer on the magnetic layer;

partially etching the magnetic layer using the nonmagnetic layer as a mask so that the first to third portions are formed in a top surface of the magnetic layer and the magnetic layer thereby becomes the pole layer;

forming the gap layer on the pole layer and the nonmagnetic layer;

forming the shield on the gap layer; and forming the coil.

9. The method according to claim 8, wherein the nonmagnetic layer is made of an inorganic insulating material.

10. The method according to claim 8, wherein the nonmagnetic layer is made of a metallic material.

11. The method according to claim 8, wherein the shield is connected to the pole layer at a position away from the medium facing surface, and the coil includes a portion that passes through a space surrounded by the pole layer and the shield.

12. The method according to claim 8, wherein the shield includes a first layer disposed adjacent to the gap layer and a second layer disposed on a side of the first layer opposite to the gap layer, and the first layer has a surface that bends to be opposed to the first portion, the second portion and the third portion with the gap layer disposed in between.

* * * * *